US012574240B2

(12) United States Patent
Wood

(10) Patent No.: US 12,574,240 B2
(45) Date of Patent: Mar. 10, 2026

(54) PROTECTING CONTENT FROM GENERATIVE ARTIFICIAL INTELLIGENCE

(71) Applicant: Dropbox, Inc., San Francisco, CA (US)

(72) Inventor: Adrian Wood, Clemmons, NC (US)

(73) Assignee: Dropbox, Inc., San Francisco, CA (US)

( * ) Notice: Subject to any disclaimer, the term of this patent is extended or adjusted under 35 U.S.C. 154(b) by 134 days.

(21) Appl. No.: 18/644,391

(22) Filed: Apr. 24, 2024

(65) Prior Publication Data

US 2025/0337574 A1 Oct. 30, 2025

(51) Int. Cl.
H04L 29/06 (2006.01)
H04L 9/32 (2006.01)

(52) U.S. Cl.
CPC ............ H04L 9/32 (2013.01); H04L 2209/16 (2013.01)

(58) Field of Classification Search
None
See application file for complete search history.

(56) References Cited

U.S. PATENT DOCUMENTS

| | | | |
|---|---|---|---|
| 10,839,208 B2 | 11/2020 | Anthony Samy et al. | |
| 11,006,077 B1 * | 5/2021 | Truong | H04N 7/15 |
| 11,856,261 B1 * | 12/2023 | Stankovska | H04N 21/44008 |
| 11,895,034 B1 * | 2/2024 | Yoskowitz | H04L 63/102 |
| 12,425,043 B2 * | 9/2025 | Theis | H03M 7/00 |
| 12,432,042 B2 * | 9/2025 | Andrews | H04L 9/001 |
| 2020/0159930 A1 * | 5/2020 | Venkateswaran | H04L 9/3247 |
| 2020/0358925 A1 * | 11/2020 | Hall | H04N 7/181 |
| 2021/0233204 A1 | 7/2021 | Alattar et al. | |

| | | | |
|---|---|---|---|
| 2023/0351060 A1 * | 11/2023 | Springer | G06F 21/6245 |
| 2024/0403484 A1 * | 12/2024 | Becker | G06T 19/006 |
| 2025/0206473 A1 * | 6/2025 | Gibbons | B64U 80/86 |
| 2025/0209583 A1 * | 6/2025 | Kwong | G06V 10/7715 |

(Continued)

OTHER PUBLICATIONS

Chen, Xin et al. Deep Manifold Learning Combined With Convolutional Neural Networks for Action Recognition. IEEE Transactions on Neural Networks and Learning Systems, vol. 29, Issue: 9. https://ieeexplore.ieee.org/stamp/stamp.jsp?tp=&arnumber= 8038860 (Year: 2018).*

(Continued)

*Primary Examiner* — Jeremiah L Avery
(74) *Attorney, Agent, or Firm* — Keller Preece PLLC

(57) ABSTRACT

The present technology introduces a simple to use interface that integrates a mechanism to protect content items from use by one or more machine learning algorithms into interfaces of a content management system. In this way, the present technology can make it easy to protect content items where they are stored. The present technology protects against this use by providing options to obfuscate content in a way that can confound artificial intelligence systems during both training and use of the artificial intelligence systems. Additionally, the present technology can control access to content items shared using a link. The content management system can determine not to serve content items when requested by known artificial intelligence systems or services that train them. The present technology can also include automatic content protection rules that can cause the content management system to automatically protect content items when the content item is to be shared.

20 Claims, 13 Drawing Sheets

(56) References Cited

U.S. PATENT DOCUMENTS

2025/0307465 A1* 10/2025 Fisher ................. G06F 21/6254
2025/0322733 A1* 10/2025 Swierkowski ......... G06V 40/18

OTHER PUBLICATIONS

Liu, HaiLong et al. Visualization of Driving Behavior Based on Hidden Feature Extraction by Using Deep Learning. IEEE Transactions on Intelligent Transportation Systems, vol. 18, Issue: 9. https://ieeexplore.ieee.org/stamp/stamp.jsp?tp=&arnumber=7839988 (Year: 2017).*

Shi, Hanyang et al. Imperceptible Visible Light Communications Based on Modified Just Imperceptible Difference and Aided by Deep Neural Network. IEEE Transactions on Green Communications and Networking, vol. 8, Issue: 3. https://ieeexplore.ieee.org/stamp/stamp.jsp?tp=&arnumber=10436542 (Year: 2024).*

Gordon R., "Using AI to Protect Against AI Image Manipulation," MIT News, Jul. 31, 2023, 8 pages, Retrieved from the Internet: URL: https://news.mit.edu/2023/using-ai-protect-against-ai-image-manipulation-0731.

Jiang H., et al., "AI Art and its Impact on Artists," AIES '23: Proceedings of the 2023 AAAI/ACM Conference on AI, Aug. 8-10, 2023, pp. 363-374, Retrieved from the Internet: URL: https://dl.acm.org/doi/10.1145/3600211.3604681.

Ren J., et al., "Copyright Protection in Generative AI: A Technical Perspective," arXiv:2402.02333v1, Feb. 4, 2024, 33 pages, Retrieved from the Internet: URL:(https://arxiv.org/pdf/2402.02333.pdf.

Sanative AI., "Building Tools to Help People Thrive in a World Blended with AI," Retrieved on Mar. 13, 2024, 5 pages, Retrieved from the Internet: URL: https://sanative.ai/.

Shan S., et al., "What Is Glaze?," Glaze, Retrieved on Mar. 12, 2024, 8 pages, Retrieved from the Internet: URL: https://glaze.cs.uchicago.edu/what-is-glaze.html.

Weatherbed J., "How To Keep Your Art out of AI Generators," The Verge, Feb. 7, 2024, 20 pages, Retrieved from the Internet: URL: (https://www.theverge.com/24063327/ai-art-protect-images.

* cited by examiner

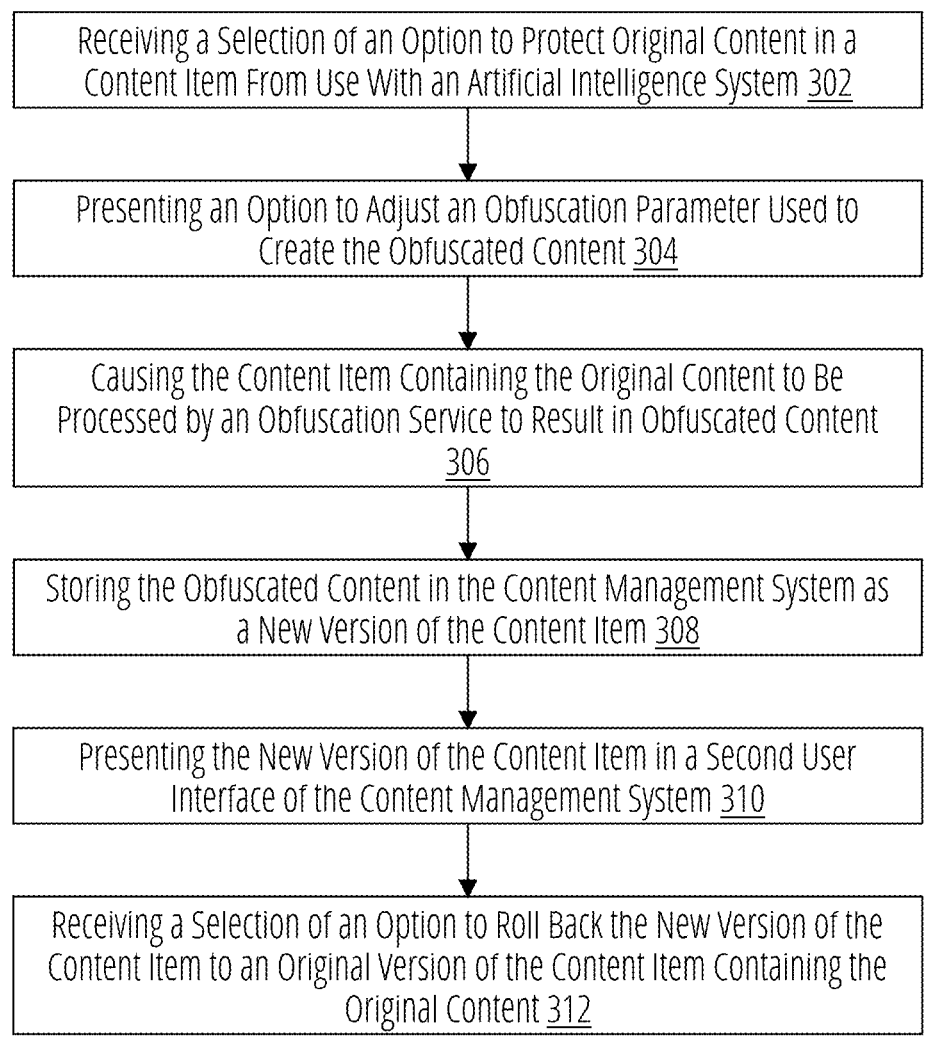

Receiving a Selection of an Option to Protect Original Content in a Content Item From Use With an Artificial Intelligence System 302

Presenting an Option to Adjust an Obfuscation Parameter Used to Create the Obfuscated Content 304

Causing the Content Item Containing the Original Content to Be Processed by an Obfuscation Service to Result in Obfuscated Content 306

Storing the Obfuscated Content in the Content Management System as a New Version of the Content Item 308

Presenting the New Version of the Content Item in a Second User Interface of the Content Management System 310

Receiving a Selection of an Option to Roll Back the New Version of the Content Item to an Original Version of the Content Item Containing the Original Content 312

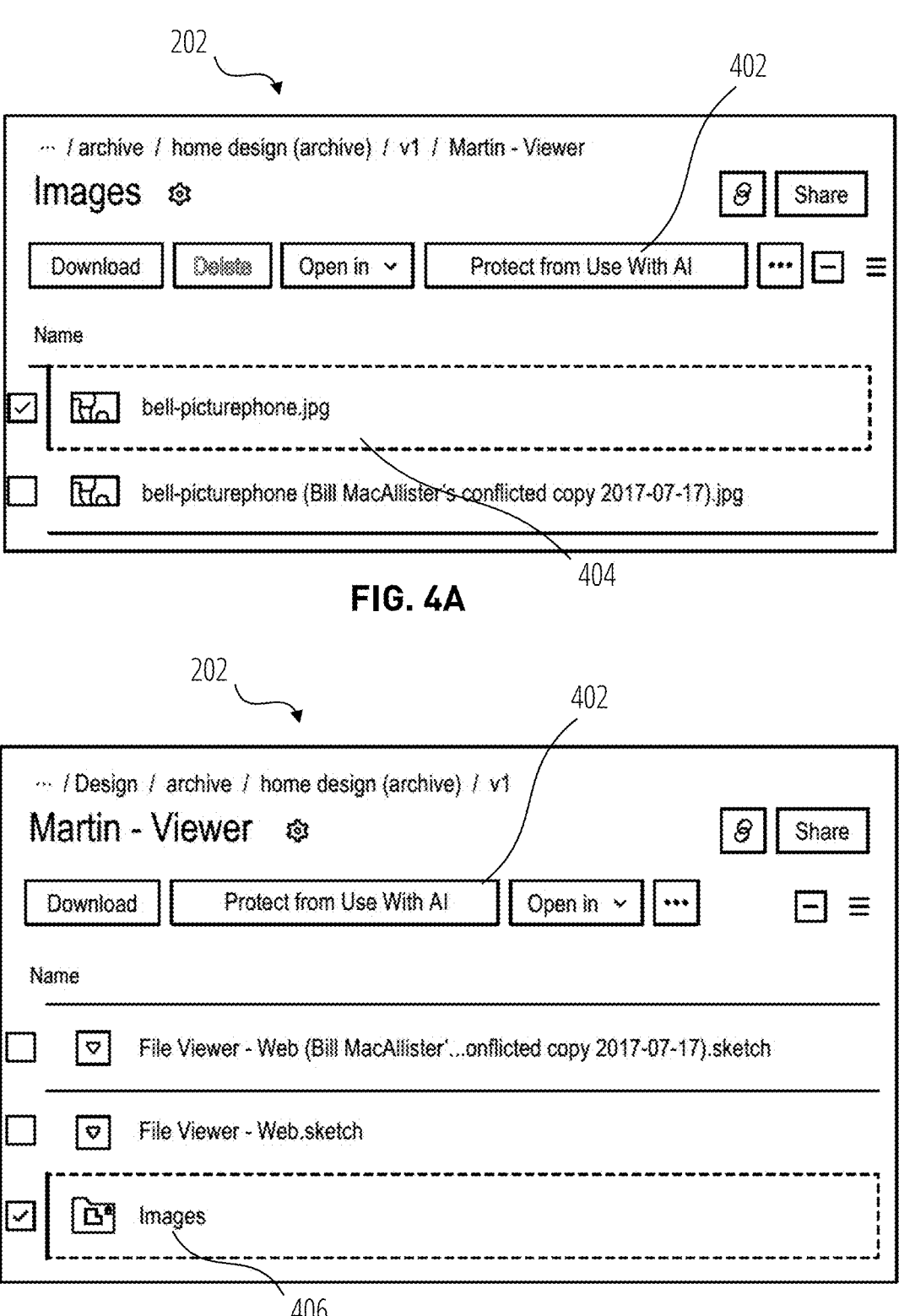

/ archive / home design (archive) / v1 / Martin - Viewer

Images ⚙                                        🔗  Share

Download | Delete | Open in ∨ | Protect from Use With AI | ••• | ⊟ | ≡

Name

☑ | 🖼 | bell-picturephone.jpg

☐ | 🖼 | bell-picturephone (Bill MacAllister's conflicted copy 2017-07-17).jpg

/ Design / archive / home design (archive) / v1

Martin - Viewer ⚙                              🔗  Share

Download | Protect from Use With AI | Open in ∨ | ••• | ⊟ | ≡

Name

☐ | ▽ | File Viewer - Web (Bill MacAllister'...onflicted copy 2017-07-17).sketch ☐ | ▽ | File Viewer - Web.sketch ☑ | 📁 | Images

202 original                    obfuscated revert 610          606          608

202

806

804

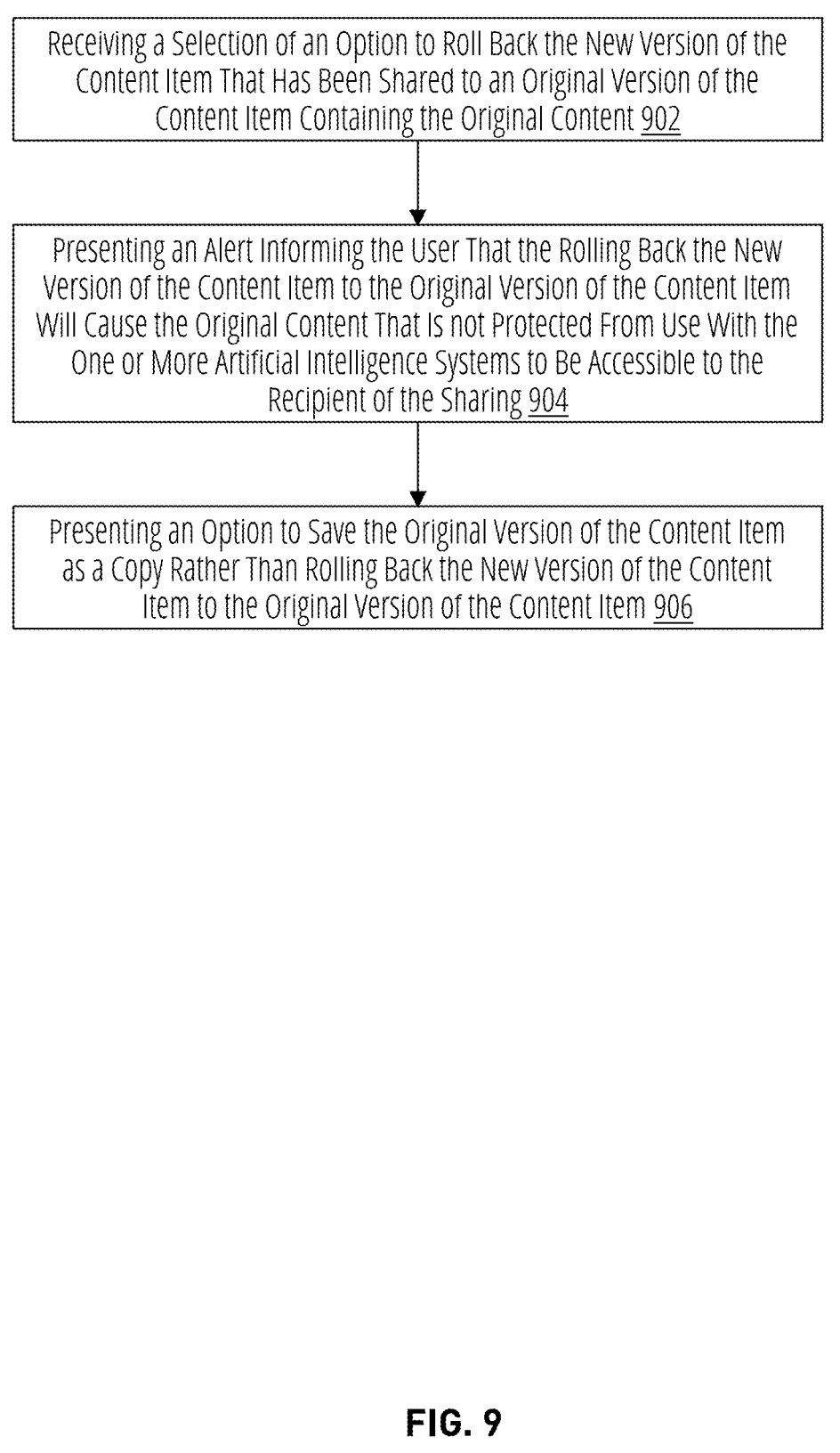

Receiving a Selection of an Option to Roll Back the New Version of the Content Item That Has Been Shared to an Original Version of the Content Item Containing the Original Content 902

Presenting an Alert Informing the User That the Rolling Back the New Version of the Content Item to the Original Version of the Content Item Will Cause the Original Content That Is not Protected From Use With the One or More Artificial Intelligence Systems to Be Accessible to the Recipient of the Sharing 904

Presenting an Option to Save the Original Version of the Content Item as a Copy Rather Than Rolling Back the New Version of the Content Item to the Original Version of the Content Item 906

FIG. 9

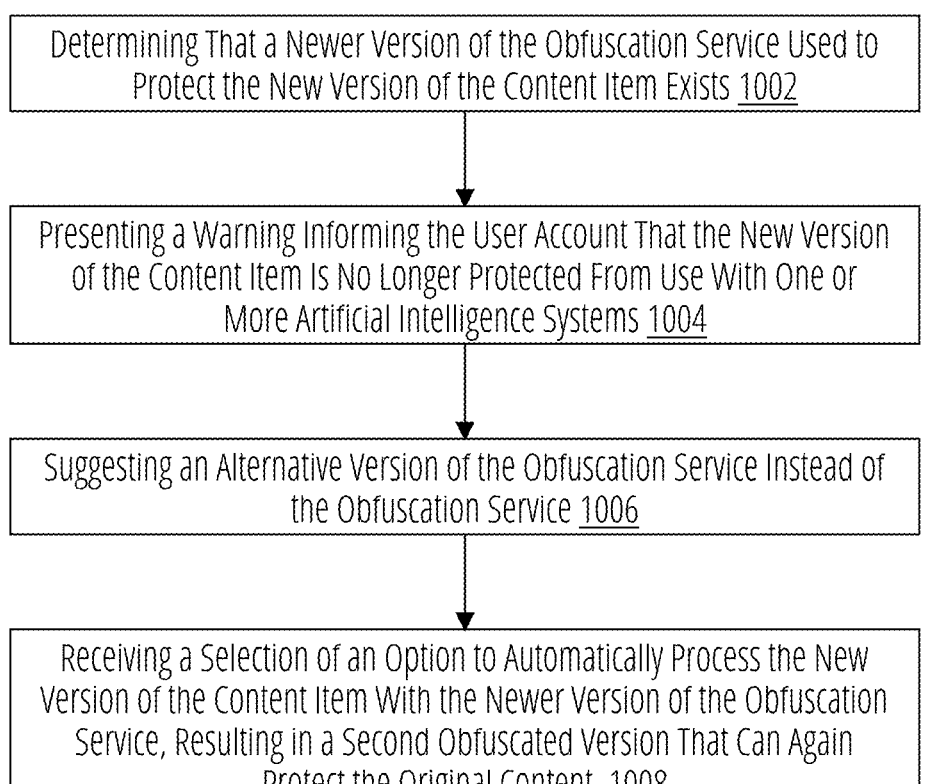

Determining That a Newer Version of the Obfuscation Service Used to Protect the New Version of the Content Item Exists 1002

Presenting a Warning Informing the User Account That the New Version of the Content Item Is No Longer Protected From Use With One or More Artificial Intelligence Systems 1004

Suggesting an Alternative Version of the Obfuscation Service Instead of the Obfuscation Service 1006

Receiving a Selection of an Option to Automatically Process the New Version of the Content Item With the Newer Version of the Obfuscation Service, Resulting in a Second Obfuscated Version That Can Again Protect the Original Content. 1008

FIG. 10

PROTECTING CONTENT FROM GENERATIVE ARTIFICIAL INTELLIGENCE

BACKGROUND

Artificial intelligence (AI) tools, and especially generative AI tools, have gained a lot of attention recently for their impressive capabilities. At the same time, copyright holders have realized that their copyrighted works may have been used to train some of these artificial intelligence algorithms. Artists have discovered significant numbers of their art pieces in training data without their knowledge, consent, credit or compensation. Generative AI can reproduce human works whole cloth from its training dataset or via prompts.

BRIEF DESCRIPTION OF THE SEVERAL VIEWS OF THE DRAWINGS

Details of one or more embodiments of the subject matter described in this disclosure are set forth in the accompanying drawings and the description below. However, the accompanying drawings illustrate only some typical embodiments of this disclosure and are therefore not to be considered limiting of its scope. Other features, embodiments, and advantages will become apparent from the description, the drawings and the claims.

FIG. 3 illustrates an example method for receiving interactions by a user interface that are effective in causing original contents within a content management system to be protected from use with an artificial intelligence system in accordance with some embodiments of the present technology.

FIG. 4A illustrates an example user interface showing a listing of content items for which it may be desired to protect the original version of the content item from use by artificial intelligence systems in accordance with some embodiments of the present technology.

FIG. 4B illustrates another instance of the user interface which includes a collection of content items for which it might be desired to protect all of the contents of the collection of content items from use by artificial intelligence systems in accordance with some embodiments of the present technology.

FIG. 9 illustrates an example method for rolling back a new version of the content item to an original version of the content item after the content item has been shared in accordance with some embodiments of the present technology.

FIG. 10 illustrates an example method for updating an obfuscation method used to protect the original content in accordance with some embodiments of the present technology.

DETAILED DESCRIPTION

Figure 1:
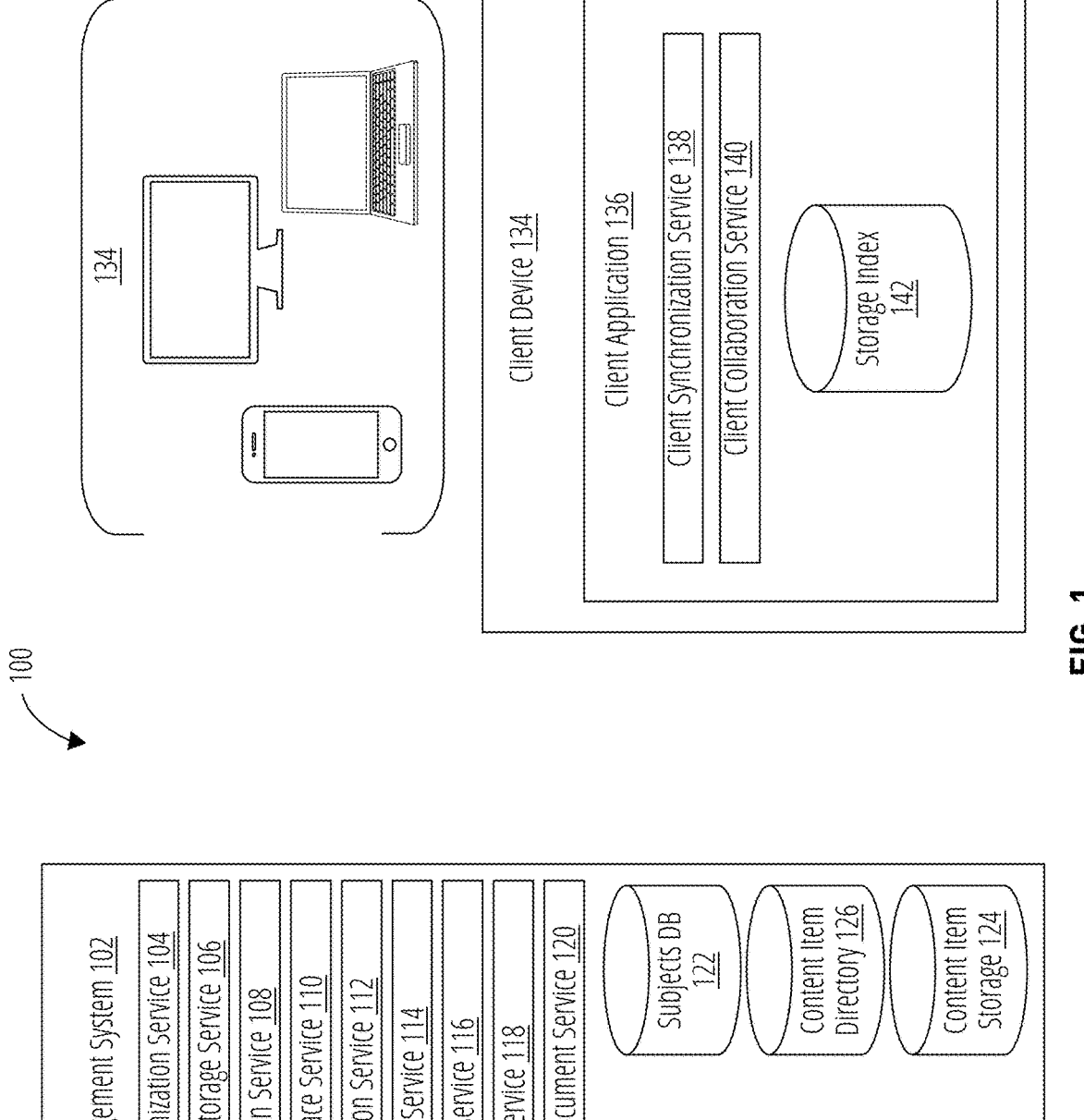
FIG. 1 illustrates an example of a content management system and client devices in accordance with some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As introduced above, copyright holders have realized that their copyrighted works may have been used to train some artificial intelligence systems. When an artist's work is used to train an artificial intelligence system, the artificial intelligence system can learn to mimic the artist's style and/or use elements of the artist's work in content created by the artificial intelligence system.

Typically, the copyrighted works are included in training sets, which are tables or lists of links to copyrighted works paired with one or more labels. Since it is undesirable to download and store the massive amount of content used to train artificial intelligence systems, and since dataset labelers do not want to be liable for providing copyrighted works for training artificial intelligence systems, the training sets are generally files containing tables or lists with labels and links to the content to which the labels pertain. The significance of the training sets including links is that the copyrighted works may still be under the control of the copyright holder since the links in the training sets point to locations on the Internet where the copyrighted works are validly displayed; they may even be on an artist's website. The copyrighted works have not been downloaded into a private repository. Therefore, copyright holders can protect their works from future use in training artificial intelligence algorithms by providing protections to the copyrighted works where they are validly displayed on the Internet.

The copyright holders cannot untrain a model that has already been trained, but they can protect their content from use in future training. For example, copyright holders can employ obfuscation techniques that make the content difficult for the generative AI to interpret. The goal of such obfuscation techniques is to make it so that the content is easily interpretable by a human, but the content is difficult to interpret and train on for an artificial intelligence system. However, in some cases, the obfuscation technique may also impair the ability of a person accessing the content item to interpret the file without additional processing endowed to those having specific rights. One type of obfuscation technique can be applied to digital images, where the images can be processed in a way that impairs the ability of an artificial intelligence system to classify the contents of the image. For example, the tool 'glaze' by researchers at the University of Chicago processes an image such that it looks generally the same to a human viewer, but AI classification tools experience about a 25% decrease in confidence in their classifications of objects within the image. Another tool called 'Mist' was created by researchers at the University of Southern California and demonstrated similar results.

While a few obfuscation tools exist, they are complicated to use and take a long time to process an image. These tools also aren't integrated into systems where copyrighted content items are managed.

The present technology introduces a simple to use interface that integrates a mechanism to protect content items from use by one or more machine learning algorithms into interfaces of a content management system. In this way, the present technology can make it easy to protect content items where they are stored.

There are at least three main use cases where content items might be used by artificial intelligence systems and the present technology addresses these. First, content items can be used to train machine learning algorithms. The present technology protects against this use case by providing options to obfuscate content in a way that can confound artificial intelligence systems, and in fact, if an artificial intelligence system was to train on enough obfuscated content items, the artificial intelligence system could learn incorrect associations that can irreparably harm the artificial intelligence system. Additionally, the present technology can control access to content items shared using a link. The content management system can determine to not serve content items when requested by known artificial intelligence systems or services that train them.

Second, content items can be supplied as prompts to artificial intelligence systems to request modifications or at least provide inspiration for an output. In addition to obfuscating the content items so that the content items are configured to confound artificial intelligence systems, the present technology can provide timely warnings when a user attempts to share a content item. The use of the content item in a prompt given to an artificial intelligence system is unlikely to be problematic when the prompt originates from a rights holder. Thus, the most problematic uses of the content item by artificial intelligence systems occur when the content item is shared outside a group of rights holders, and the present technology can provide warnings or suggestions to protect content items prior to being shared. In some embodiments, the present technology can also include automatic content protection rules that can cause the content management system to automatically protect content items when the content item is to be shared.

Third, the content management system itself might attempt to train its own artificial intelligence systems on content within the content management system. The present technology can address this use case by again storing obfuscated content which the artificial intelligence systems cannot effectively train on, and the automatic content protection rules can indicate that the content item should not be used to train artificial intelligence systems, which the content management system will respect.

An additional and ongoing challenge that is relevant to all three use cases is the inevitable cat-and-mouse game of more capable artificial intelligence systems and better content item protection techniques. Accordingly, the present technology can provide warnings to a user to indicate when a protection technique used to protect a content item has become outdated. In some embodiments, content items can even be processed to have their protection mechanisms updated.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In some embodiments the disclosed technology is deployed in the context of a content management system having content item synchronization capabilities and collaboration features, among others. An example system configuration 100 is shown in FIG. 1, which depicts content management system 102 interacting with client device 134.

Accounts

Content management system 102 can store content items in association with accounts, as well as perform a variety of content item management tasks, such as retrieve, modify, browse, and/or share the content item(s). Furthermore, content management system 102 can enable an account to access content item(s) from multiple client devices.

Content management system 102 supports a plurality of accounts. A subject (user, group, team, company, etc.) can create an account with content management system, and account details can be stored in subject database 122. Subject database 122 can identify a registered subject by a subject ID, and store profile information for registered subjects in association with the subject ID. In some cases, profile information for registered subjects includes a subject name and/or email address. Subject database 122 can include account management information, such as account type (e.g. various tiers of free or paid accounts), storage space allocated, storage space used, client devices 134 having a registered content management client application 136 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 122 need not store complete information associated with an account for a subject. Some portion of information associated with an account for a subject can also be stored in another database of content management system 102 such as metadata database 130, or in a database external to content management system 102.

Subject database 122 can store groups of accounts associated with a subject. Groups can have permissions based on group permissions statements and/or access control lists, and members of the groups can inherit the permissions. For example, a marketing group can have access to one set of content items while an engineering group can have access to another set of content items. An administrator group can modify groups, modify subject accounts, etc. Groups are also subjects identified by subject ID.

In some embodiments, subject database 122 can be broken into a plurality of tables, indexes and other data structures.

Content Item Storage

A feature of content management system 102 is the storage of content items, which can be stored in content item storage 124. A content item generally is any entity that can be recorded in a file system. Content items can include digital data such as documents, collaboration content items, text files, audio files, image files, video files, webpages, executable files, binary files, content item directories, collection of content items, zip files, playlists, albums, symlinks, cloud docs, mounts, placeholder content items referencing other content items in content management system 102 or in other content management systems, etc.

In some embodiments, content items can be grouped into a collection, which can refer to a folder including a plurality of content items, or a plurality of content items that are related or grouped by a common attribute.

In some embodiments, content item storage 124 is combined with other types of storage or databases to handle specific functions. Content item storage 124 can store content items, while metadata regarding the content items can be stored in metadata database 130. Likewise, data regarding where a content item is stored in content item storage 124 can be stored in content item directory 126. Additionally, data regarding changes, access, etc. can be stored in content item database 132. Content item database 132 can also include a subject account identifier that identifies the subject IDs that have access to the content item.

In some embodiments, content item database 132 can be broken into a plurality of tables, indexes and other data structures.

Each of the various storages/databases such as content item storage 124, content item directory 126, content item database 132, and metadata database 130 can be comprised of more than one such storage or database and can be distributed over many devices and locations. Other configurations are also possible. For example, data from content item storage 124, content item directory 126, content item database 132, and/or metadata database 130 may be combined into one or more content item storages or databases or further segmented into additional content item storages or databases. Thus, content management system 102 may include more or less storages and/or databases than shown in FIG. 1.

In some embodiments, content item storage 124 is associated with at least one content item storage service 106, which includes software or other processor executable instructions for managing the storage of content items including, but not limited to, receiving content items for storage, preparing content items for storage, selecting a storage location for the content item, retrieving content items from storage, etc. In some embodiments, content item storage service 106 can divide a content item into smaller chunks for storage at content item storage 124. The location of each chunk making up a content item can be recorded in content item directory 126. Content item directory 126 can include a content entry for each content item stored in content item storage 124. The content entry can be associated with a content item ID, which uniquely identifies a content item.

In some embodiments, each content item and each chunk of a content item can also be identified from a deterministic hash function. This method of identifying a content item and chunks of content items can ensure that content item duplicates are recognized as such since the deterministic hash function will output the same hash for every copy of the same content item, but will output a different hash for a different content item. Using this methodology, content item storage service 106 can output a unique hash for each different version of a content item. The content item storage service 106 can also output deterministic hashes for different chunks of the content item such that only new portions of a content item are recognized as unique.

Content item storage service 106 can also designate or record a parent of a content item or a content path for a content item in content item database 132. The content path can include the name of the content item and/or folder hierarchy associated with the content item. For example, the content path can include a folder or path of folders in which the content item is stored in a local file system on a client device. In some embodiments, content item database might only store a direct ancestor or direct child of any content item, which allows a full path for a content item to be derived, and can be more efficient than storing the whole path for a content item.

While content items are stored in content item storage 124 in blocks and may not be stored under a tree like directory structure, such directory structure is a comfortable navigation structure for subjects viewing content items. Content item storage service 106 can define or record a content path for a content item wherein the "root" node of a directory structure can be any directory with specific access privileges assigned to it, as opposed to a directory that inherits access privileges from another directory.

In some embodiments, a root directory can be mounted underneath another root directory to give the appearance of a single directory structure. This can occur when an account has access to a plurality of root directories. As addressed above, the directory structure is merely a comfortable navigation structure for subjects viewing content items, but does not correlate to storage locations of content items in content item storage 124.

While the directory structure in which an account views content items does not correlate to storage locations of the content items at content management system 102, the directory structure can correlate to storage locations of the content items on client device 134 depending on the file system used by client device 134.

As addressed above, a content entry in content item directory 126 can also include the location of each chunk making up a content item. More specifically, the content entry can include content pointers that identify the location in content item storage 124 of the chunks that make up the content item.

Content item storage service 106 can decrease the amount of storage space required by identifying duplicate content items or duplicate blocks that make up a content item or versions of a content item. Instead of storing multiple copies, content item storage 124 can store a single copy of the content item or block of the content item, and content item directory 126 can include a pointer or other mechanism to link the duplicates to the single copy.

Content item storage service 106 can also store metadata describing content items, content item types, collections of content items, file path, and/or the relationship of content items to various accounts, collections, or groups in metadata database 130, in association with the content item ID of the content item.

Content item storage service 106 can also store a log of data regarding changes, access, etc. in content item database 132. Content item database 132 can include the content item ID of the content item and can optionally include a description of the change or access action along with a time stamp or version number and any other relevant data. Content item database 132 can also include pointers to blocks affected by the change or content item access. Content item storage service 106 can also provide the ability to undo operations, by using a content item version control mechanism that tracks changes to content items, different versions of content items (including diverging version trees), and a change history that can be acquired from content item database 132.

Content Item Synchronization

Another feature of content management system 102 is synchronization of content items with at least one client device 134. Client devices 134 can take different forms and have different capabilities. For example, client device 134 can be a computing device having a local file system accessible by multiple applications resident thereon. Client device 134 can be a computing device wherein content items are only accessible to a specific application or by permission given by the specific application, and the content items are typically stored either in an application specific space or in the cloud. Client device 134 can be any client device accessing content management system 102 via a web browser and accessing content items via a web interface. While example client device 134 is depicted in form factors such as a laptop, mobile device, or web browser, it should be understood that the descriptions thereof are not limited to devices of these example form factors. For example a mobile device might have a local file system accessible by multiple applications resident thereon, or might access content management system 102 via a web browser. As such, the form factor should not be considered limiting when considering client device 134's capabilities. One or more functions described herein with respect to client device 134 may or may not be available on every client device depending on the specific capabilities of the device—the file access model being one such capability.

In many embodiments, client devices 134 are associated with an account of content management system 102, but in some embodiments client device 134 can access content using shared links and do not require an account.

As noted above, some client devices can access content management system 102 using a web browser. However, client devices can also access content management system 102 using client application 136 stored and running on client device 134. Client application 136 can include a client synchronization service 138.

Client synchronization service 138 can be in communication with server synchronization service 104 to synchronize changes to content items between client device 134 and content management system 102.

Client device 134 can synchronize content with content management system 102 via client synchronization service 138. The synchronization can be platform agnostic. That is, content can be synchronized across multiple client devices of varying types, capabilities, operating systems, etc. Client synchronization service 138 can synchronize any changes (e.g., new, deleted, modified, copied, or moved content items) to content items in a designated location of a file system of client device 134.

Content items can be synchronized from client device 134 to content management system 102, and vice versa. In embodiments wherein synchronization is from client device 134 to content management system 102, a subject can manipulate content items directly from the file system of client device 134, while client synchronization service 138 can monitor directory on client device 134 for changes to files within the monitored collections of content items.

When client synchronization service 138 detects a write, move, copy, or delete of content in a directory that it monitors, client synchronization service 138 can synchronize the changes to content item storage service 106. In some embodiments, client synchronization service 138 can perform some functions of content item storage service 106 including functions addressed above such as dividing the content item into blocks, hashing the content item to generate a unique identifier, etc. Client synchronization service 138 can index content within client storage index 142 and save the result in client storage index 142. Indexing can include storing paths plus the content item identifier, and a unique identifier for each content item. In some embodiments, client synchronization service 138 learns the content item identifier from server synchronization service 104, and learns the unique client identifier from the operating system of client device 134.

Client synchronization service 138 can use storage index 142 to facilitate the synchronization of at least a portion of the content items within client storage with content items associated with a subject account on content management system 102. For example, client synchronization service 138 can compare storage index 142 with content management system 102 and detect differences between content on client storage and content associated with a subject account on content management system 102. Client synchronization service 138 can then attempt to reconcile differences by uploading, downloading, modifying, and deleting content on client storage as appropriate. Content item storage service 106 can store the changed or new block for the content item and update content item database 132, metadata database 130, content item directory 126, content item storage 124, subject database 122, etc. as appropriate.

When synchronizing from content management system 102 to client device 134, data regarding a mount, modification, addition, deletion, move of a content item recorded in content item database 132 can trigger a notification to be sent to client device 134 using notification service 108. When client device 134 is informed of the change, client device 134 can make a request for changes listed in content item database 132 since the last synchronization point known to the client device. When client device 134 determines that it is out of synchronization with content management system 102, client synchronization service 138 requests content item blocks including the changes, and updates its local copy of the changed content items.

In some embodiments, storage index 142 stores tree data structures wherein one tree reflects the latest representation of a directory according to server synchronization service 104, while another tree reflects the latest representation of the directory according to client synchronization service 138. Client synchronization service 138 can work to ensure that the tree structures match by requesting data from server synchronization service 104 or committing changes on client device 134 to content management system 102.

Sometimes client device 134 might not have a network connection available. In this scenario, client synchronization service 138 can monitor the linked collection for content item changes and queue those changes for later synchronization to content management system 102 when a network connection is available. Similarly, a subject can manually start, stop, pause, or resume synchronization with content management system 102.

Client synchronization service 138 can synchronize all content associated with a particular subject account on content management system 102. Alternatively, client synchronization service 138 can selectively synchronize some of the content items associated with the particular subject account on content management system 102. Selectively synchronizing only some of the content items can preserve space on client device 134 and save bandwidth.

In some embodiments, client synchronization service 138 selectively stores a portion of the content items associated with the particular subject account and stores placeholder content items in client storage for the remainder portion of the content items. For example, client synchronization service 138 can store a placeholder content item that has the same filename, path, extension, metadata, of its respective complete content item on content management system 102, but lacking the data of the complete content item. The placeholder content item can be a few bytes or less in size while the respective complete content item might be significantly larger. After client device 134 attempts to access the content item, client synchronization service 138 can retrieve the data of the content item from content management system 102 and provide the complete content item to client device 134. This approach can provide significant space and bandwidth savings while still providing full access to a subject's content items on content management system 102.

While the synchronization embodiments addressed above referred to client device 134 and a server of content management system 102, it should be appreciated by those of ordinary skill in the art that a user account can have any number of client devices 134 all synchronizing content items with content management system 102, such that changes to a content item on any one client device 134 can propagate to other client devices 134 through their respective synchronization with content management system 102.

Collaboration Features

Another feature of content management system 102 is to facilitate collaboration between subjects. Collaboration features include content item sharing, commenting on content items, co-working on content items in real time, instant messaging, providing presence and "seen" state information regarding content items, etc.

Sharing

Content management system 102 can manage sharing content items via sharing service 114. Sharing a content item by providing a link to the content item can include making the content item accessible from any computing device in network communication with content management system 102. However, in some embodiments a link can be associated with access restrictions enforced by content management system 102 and Identity and Access Management service (IAM service) 118. Sharing content can also include linking content using sharing service 114 to share content within content management system 102 with at least one additional subject account (in addition to the original subject account associated with the content item) so that each subject account has access to the content item. The additional subject account can gain access to the content by accepting the content, which will then be accessible through either web interface service 110 or directly from within the directory structure associated with their account on client device 134. The sharing can be performed in a platform agnostic manner. That is, the content can be shared across multiple client devices 134 of varying type, capabilities, operating systems, etc. The content can also be shared across varying types of subject accounts.

To share a content item within content management system 102, sharing service 114 can associate a subject ID of a team or of one or more subject accounts with an original content in content item database 132 associated with the content item, thus granting the added subject account(s) access to the content item. Sharing service 114 can also remove subject IDs from being permitted to access an original content in content item database 132 to restrict a subject account's access to the content item. Sharing service 114 can record content item identifiers, subject identifiers given access to a content item, and access levels in content item database 132. For example, in some embodiments, subject identifiers associated with a single content item can specify different permissions for respective subject identifiers with respect to the associated content item.

In some embodiments, content management system 102 can include an access control list 128 which includes a description of complete access rights pertaining to a respective content item. An access control list for any respective content item in content management system can be derived from content item database 132. In some embodiments, it is not desirable to maintain a persistent access control list 128 for a respective content item, as an access control list 128 for a respective content item can be derived when needed. In some embodiments, content items can inherit access rights from another content item such as ancestor content items.

To share content items outside of content management system 102, sharing service 114 can generate a custom network address, such as a uniform resource locator (URL), which allows any web browser to access the content item or collection in content management system 102 without any authentication. To accomplish this, sharing service 114 can include content identification data in the generated URL, which can later be used to properly identify and return the requested content item. For example, sharing service 114 can include a token identifying a content item ID and optionally a subject ID in the generated URL. Upon selection of the URL, the content identification data included in the URL can be transmitted to content management system 102, which can use the received content identification data to identify the appropriate content item and return the content item.

In addition to generating the URL, sharing service 114 can also be configured to record in content item database 132 that a URL to the content item has been created. In some embodiments, an entry into content item database 132 associated with a content item can include a URL flag indicating whether a URL to the content item has been created. For example, the URL flag can be a Boolean value initially set to 0 or false to indicate that a URL to the content item has not been created. Sharing service 114 can change the value of the flag to 1 or true after generating a URL to the content item.

In some embodiments, sharing service 114 can associate a set of permissions to a URL for a content item. For example, if a subject attempts to access the content item via the URL, sharing service 114 can provide a limited set of permissions for the content item. Examples of limited permissions include restrictions that the subject cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 114 can also be configured to deactivate a generated URL. For example, each entry into content item database 132 can also include a URL active flag indicating whether the content should be returned in response to a request from the generated URL. For example, sharing service 114 can only return a content item requested by a generated link if the URL active flag is set to 1 or true. Thus, access to a content item for which a URL has been generated can be easily restricted by changing the value of the URL active flag. This allows a subject to restrict access to the shared content item without having to move the content item or delete the generated URL. Likewise, sharing service 114 can reactivate the URL by again changing the value of the URL active flag to 1 or true. A subject can thus easily restore access to the content item without the need to generate a new URL.

In some embodiments, content management system 102 can designate a URL for uploading a content item. For example, a first subject with a subject account can request such a URL, provide the URL to a contributing subject and the contributing subject can upload a content item to the first subject's subject account using the URL.

Team Service

In some embodiments content management system 102 includes team service 116. Team service 116 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Team service 116 can provide a common shared space for the team, private subject account collections of content items, and access limited shared collections of content items. Team service 116 can also provide a management interface for an administrator to manage collections and content items within team, and can manage subject accounts that are associated with the team. Teams, sub-teams, subject accounts are all given a subject identifier in subject database 122, and the membership to teams by subject accounts is also recorded in subject database 122.

IAM (Identity and Access Management) Service

In some embodiments, content management system 102 includes IAM service 118. IAM service 118 can authenticate a subject account. For subject accounts with multiple levels of rights (e.g. a subject account with subject rights and administrator rights) IAM service 118 can also facilitate explicit privilege escalation to avoid unintentional actions by administrators.

Content Item Access

Content item storage service 106 can receive a token from client application 136 that follows a request to access a content item and can return the capabilities permitted to the subject account.

Presence and Seen State

In some embodiments, content management system 102 can provide information about how subjects with which a content item is shared are interacting or have interacted with the content item. In some embodiments, content management system 102 can report that a subject with which a content item is shared is currently viewing the content item. For example, client collaboration service 140 can notify notification service 108 when client device 134 is accessing the content item. Notification service 108 can then notify all client devices of other subjects having access to the same content item of the presence of the subject of client device 134 with respect to the content item.

In some embodiments, content management system 102 can report a history of subject interaction with a shared content item. Collaboration service 112 can query data sources such as metadata database 130 and content item database 132 to determine that a subject has saved the content item, that a subject has yet to view the content item, etc., and disseminate this status information using notification service 108 to other subjects so that they can know who currently is or has viewed or modified the content item.

Collaboration service 112 can facilitate comments associated with content, even if a content item does not natively support commenting functionality. Such comments can be stored in metadata database 130.

Collaboration service 112 can originate and transmit notifications for subjects. For example, a subject can mention another subject in a comment and collaboration service 112 can send a notification to that subject letting them know that they have been mentioned in the comment. Various other content item events can trigger notifications, including deleting a content item, sharing a content item, etc.

Collaboration service 112 can also provide a messaging platform whereby subjects can send and receive instant messages, voice calls, emails, etc.

Collaboration Content Items

In some embodiments, content management service can also include collaborative document service 120 which can provide an interactive content item collaboration platform whereby subjects can simultaneously create collaboration content items, comment in the collaboration content items, and manage tasks within the collaboration content items. Collaboration content items can be files that subjects can create and edit using a collaboration content item editor, and can contain collaboration content item elements. Collaboration content item elements may include a collaboration content item identifier, one or more author identifiers, collaboration content item text, collaboration content item attributes, interaction information, comments, sharing subjects, etc. Collaboration content item elements can be stored as database entities, which allows for searching and retrieving the collaboration content items. Multiple subjects may access, view, edit, and collaborate on collaboration content items at the same time or at different times. In some embodiments this can be managed by requiring two subjects access a content item through a web interface and there they can work on the same copy of the content item at the same time.

Third Party Services

In some embodiments content management system 102 can include functionality to interface with one or more third party services such as workspace services, email services, task services, etc. In such embodiments, content management system 102 can be provided with login credentials for a subject account at the third party service to interact with the third party service to bring functionality or data from those third party services into various subject interfaces provided by content management system 102.

While content management system 102 is presented with specific components, it should be understood by one skilled in the art, that the architectural system configuration 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural system configuration 100 is simply one possible configuration and that other configurations with more or fewer components are possible.

Figure 2:
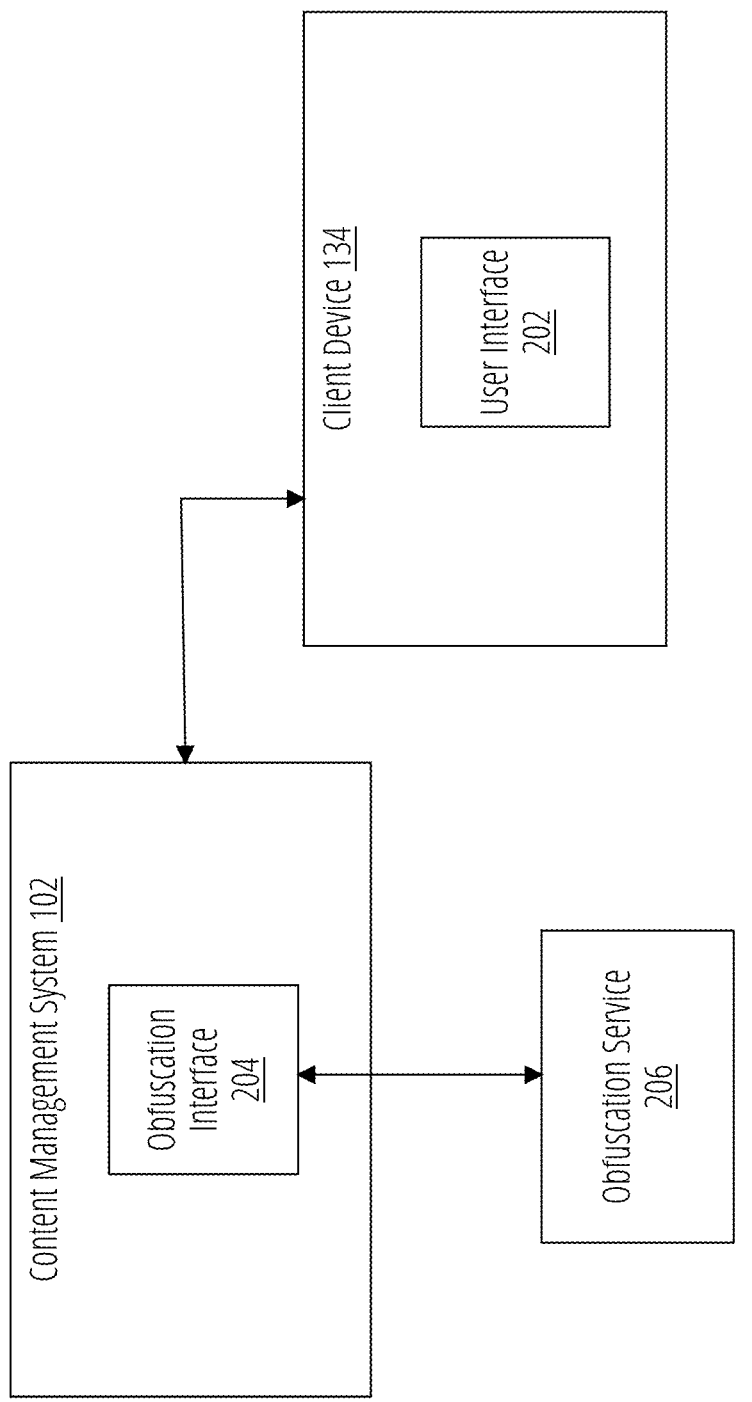
FIG. 2 illustrates an example system configuration in accordance with some embodiments of the present technology.

FIG. 2 illustrates an example system configuration in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

FIG. 2 illustrates content management system 102 including obfuscation interface 204. Obfuscation interface 204 is a service that can interface with one or more obfuscation services 206. For example, obfuscation interface 204 can include programming effective to interact with one or more obfuscation service 206 to configure those obfuscation services 206 to perform an obfuscation task.

While obfuscation service 206 is illustrated as being separate from content management system 102, this arrangement should not be considered limiting. Content management system 102 could include its own versions of one or more obfuscation services 206. Accordingly, obfuscation service 206 can be a publicly available obfuscation service, an instance of a publicly available obfuscation service accessible only to the content management system 102, or a proprietary obfuscation service.

While obfuscation service 206 is described as performing a technique that can prevent artificial intelligence systems, including artificial intelligence models and algorithms and machine learning models and algorithms, from properly interpreting content in a content item, and especially a technique that confounds artificial intelligence systems when they attempt to classify objects in images or video, obfuscation service 206 can provide alternative or additional forms of content protection that can confound an artificial intelligence system in other ways. For example, obfuscation service 206 might use homoglyphs or hidden characters to confound an artificial intelligence system attempting to interpret a document but that a human could still comprehend. Homoglyphs are one of two or more graphemes, characters, or glyphs with shapes that appear identical or very similar but may have differing meanings. The present technology does not intend any limitation on the type of obfuscation unless those limitations are recited in the appended claims.

Client device 134 includes user interface 202. User interface 202 can be provided by client application 136 or via a web browser executing on client device 134. As will be described further herein, user interface 202 can provide options to obfuscate content items, and information about unprotected content items.

As addressed herein, the present technology can utilize obfuscation service 206 to generate obfuscated content. Obfuscated content can be content that is visible and comprehendible (discernable) to a human user, but the content has been processed to confound an artificial intelligence system, model, or algorithm attempting to utilize the content item. In some embodiments, the content that is visible and comprehendible to a human user might be substantially indistinguishable to the human user when compared to the original content. There might be small artifacts that could be noticeable with careful study or by a person trained to find such artifacts, but such artifacts are likely not noticeable to a human user who is not looking for such artifacts.

FIG. 3 illustrates an example method for receiving interactions by a user interface that is effective in causing original content in one or more content items within a content management system to be protected from use with an artificial intelligence system in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As introduced above, copyright holders have realized that their copyrighted works may have been used to train some artificial intelligence systems. Typically, the copyrighted works are included in training sets, which are lists of links to copyrighted works paired with one or more labels. The significance of the training sets including links is that the copyrighted works may still be under the control of the copyright holder. The copyrighted works have not been downloaded into a private repository. Therefore, copyright holders can protect their works from future use in training artificial intelligence algorithms. FIG. 3 provides a method for copyright holders and other managers of content items to protect content by obfuscating the content in content items to result in new versions of the content items that may confound one or more artificial intelligence systems.

Figure 8:
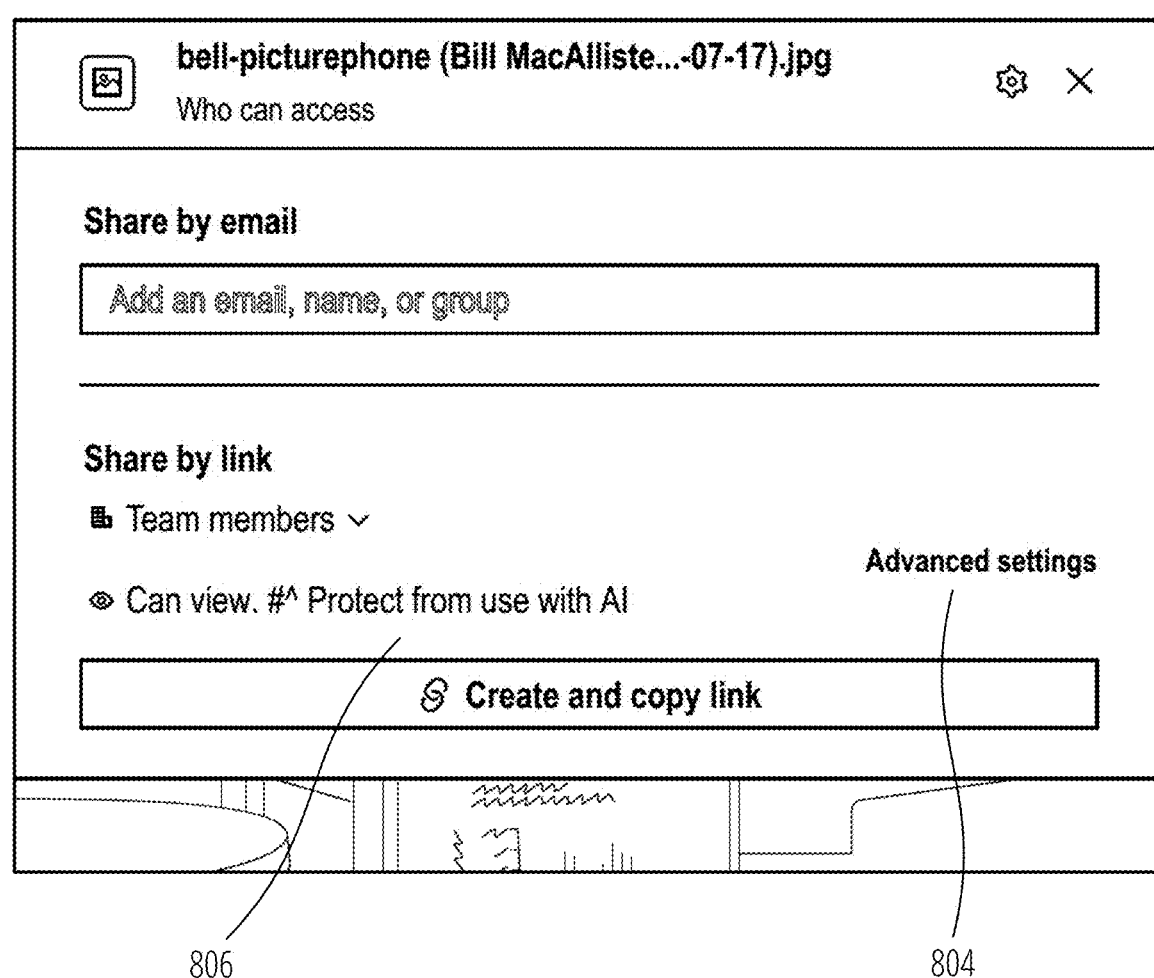
FIG. 8 illustrates an example sharing modal within the user interface, providing an option to obfuscate content that is to be shared in accordance with some embodiments of the present technology.

A user interface, such as user interface 202, can display content items managed by a content management system. Some of the content items may include content that is not protected against use by artificial intelligence systems. In some embodiments, the user interface 202 can be a content item browsing interface that is effective in browsing content items associated with the user account with the content management system. FIG. 4A and FIG. 4B illustrates examples of user interface 202 as a content item browsing interface. In some embodiments, the user interface is a sharing interface effective for sharing content items with at least one additional user or group. FIG. 8 illustrates an example of user interface 202 as a sharing interface.

According to some examples, the method includes receiving a selection of an option to protect original content in a content item from use with an artificial intelligence system at block 302. For example, the user interface 202 illustrated in FIG. 2 may receive a selection of an option to protect original content in a content item from use with an artificial intelligence system. FIG. 4A and FIG. 4B illustrate the option to protect original content 402. As used herein, the term "original content" is used to refer to content that is not protected against use by artificial intelligence systems. The term original content does not necessarily mean that the content itself is an original as that term might be used in copyright law.

In some embodiments, the user interface 202 may provide a warning that the original content is not protected against use by artificial intelligence systems, or might otherwise highlight the original content to be protected from use with one or more artificial intelligence systems. Such a warning or suggestion to protect a content item can lead to the selection of the option to protect the original content.

Obfuscating the content item can be a resource-intensive process, and there can be varying qualities of obfuscation. The level of obfuscation, the amount of human-discernable artifacts in the obfuscated content, and the length of processing time to produce obfuscated content are interrelated factors. For example, it might not be resource-intensive to produce obfuscated content that includes clearly visible artifacts of the obfuscation process, but it can be highly resource-intensive to create obfuscated content that has few, if any, human-discernable artifacts in the obfuscated content. Similarly, the greater the quality of the obfuscation, the harder it is to produce obfuscated content with few, if any, human-discernable artifacts. Accordingly, the obfuscation service 206 can provide options that allow a user to balance the amount of time it takes to create the obfuscated content, the quality of the obfuscation, and the amount of human-discernable artifacts likely to be present in the obfuscated content. The native obfuscation tools at obfuscation service 206 can permit these and other options to be configured, but they are not easy to use and generally require experience using such tools.

According to some examples, the method includes presenting one or more options to adjust an obfuscation parameter used to create the obfuscated content at block 304. For example, the user interface 202 illustrated in FIG. 2 may present an option to adjust at least one obfuscation parameter used to create the obfuscated content. As noted above, an increase in the quality of the obfuscation parameter could result in greater protection for the original content but may increase visible artifacts in the obfuscated content, and a decrease in the obfuscation parameter could result in less protection for the original content but may come with less visible artifacts in the obfuscated content. The amount of processing time could also be affected.

User interface 202 can present such options in a clear and understandable manner that abstracts away the complexity involved in direct interaction with obfuscation service 206. For example, user interface 202 can present available options using interdependent sliders that visually indicate the relationship of one option on other options. User interface 202 can also provide estimates of processing time to complete an obfuscation task on a content item.

In some embodiments, such options might not be presented in user interface 202. This might be desirable to further reduce the complexity of creating obfuscated content.

According to some examples, the method includes causing the content item containing the original content to be processed by an obfuscation service to result in obfuscated content at block 306. For example, after receiving a selection of an option to obfuscate the original content and any additional options, the content management system 102 illustrated in FIG. 1 may cause the content item containing the original content to be processed by an obfuscation service to result in obfuscated content. The obfuscated content is configured to confound one or more artificial intelligence systems but is still visible to a human viewer. For example, when the content item is an image or contains an image, the image should be visible to the human viewer. In some instances, the human viewer would find it difficult to discern differences between the original content and the obfuscated content, but an artificial intelligence system would have less confidence in understanding or interpreting the contents of the image (e.g., classifying objects in the image).

According to some examples, the method includes storing the obfuscated content in the content management system as a new version of the content item at block 308. For example, the content management system 102 illustrated in FIG. 1 may store the obfuscated content in the content management system as a new version of the content item.

According to some examples, the method includes presenting the new version of the content item in the user interface of the content management system at block 310. For example, the user interface 202 illustrated in FIG. 2 may present the new version of the content item containing the obfuscated content. The new version of the content item can be presented in a list of content items with an indicator to signal that the new version of the content item is protected from use with the one or more artificial intelligence systems. The new version of the content item could also be presented as a view of the content of the new version of the content item (e.g., a rendering of the image when the content item is an image) along with an indicator to signal that the new version of the content item is protected from use with the one or more artificial intelligence systems.

According to some examples, the method includes receiving a selection of an option to roll back the new version of the content item to an original version of the content item containing the original content at block 312. For example, the user interface 202 illustrated in FIG. 2 may receive a selection of an option to roll back the new version of the content item to an original version of the content item containing the original content. In some embodiments, the user might review the obfuscated content and determine that the obfuscated content contains too many artifacts and can make use of a versioning system of content management system 102 to return the content item to the original content. In some embodiments, the user might determine that they wish to edit the content item, and for this reason, they wish to return the content item to the original content.

FIG. 4A illustrates an example user interface showing a listing of content items for which it may be desired to protect the original version of the content item from use by artificial intelligence systems in accordance with some embodiments of the present technology. For example, one such content item is image 404. User interface 202 presents an option 402 to protect original content from use with one or more artificial intelligence systems. Selection of the option to protect original content 402 can cause image 404 to be processed by the obfuscation service 206 to create a new version of the content item that includes obfuscated content. In some examples, the obfuscated content is a version of the image where there are few, if any, discernible artifacts resulting from the obfuscation service; however, a machine learning model attempting to classify objects in the image will experience significantly reduced confidence in classifications of objects in the image.

FIG. 4B illustrates another instance of the user interface, which includes a collection of content items for which it might be desired to protect all of the contents of the collection of content items from use by artificial intelligence systems in accordance with some embodiments of the present technology. FIG. 4B also illustrates a listing of content items but in FIG. 4B the user has selected collection of content items and selected the option to protect original content 402, whereby all of the content items within the collection of content items (including content items that may be added to the collection of content items in the future) can be automatically processed by obfuscation service 206 to result in new versions of the content items stored within the collection of content items.

While FIG. 4A and FIG. 4B illustrates a particular user interface, the present technology should not be considered limited to use with such an interface. Rather the user interfaces illustrated in FIG. 4A and FIG. 4B are provided to illustrate example options and example functionality provided by the present technology.

Figure 5:
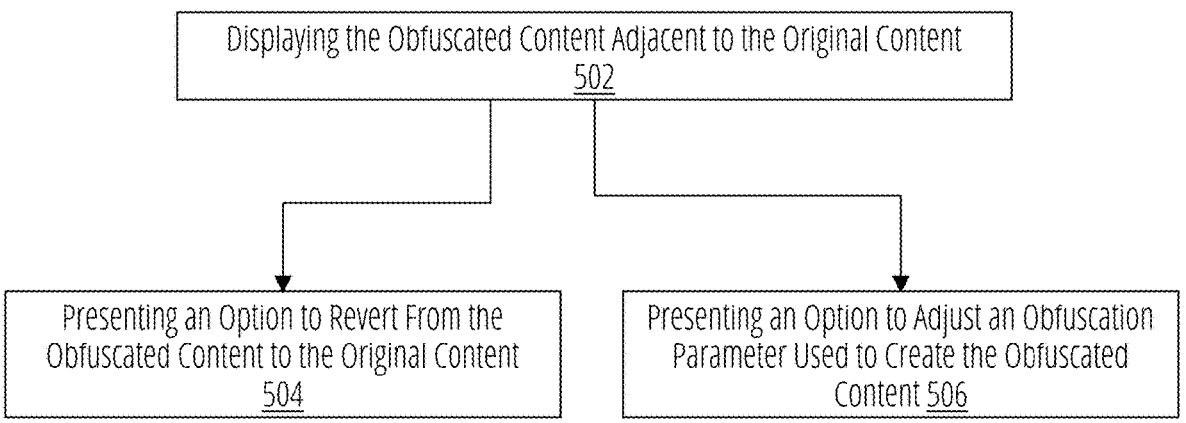
FIG. 5 illustrates an example method for presenting the obfuscated content adjacent to the original content in accordance with some embodiments of the present technology.

FIG. 5 illustrates an example method for presenting the obfuscated content adjacent to the original content in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

Figure 6A:
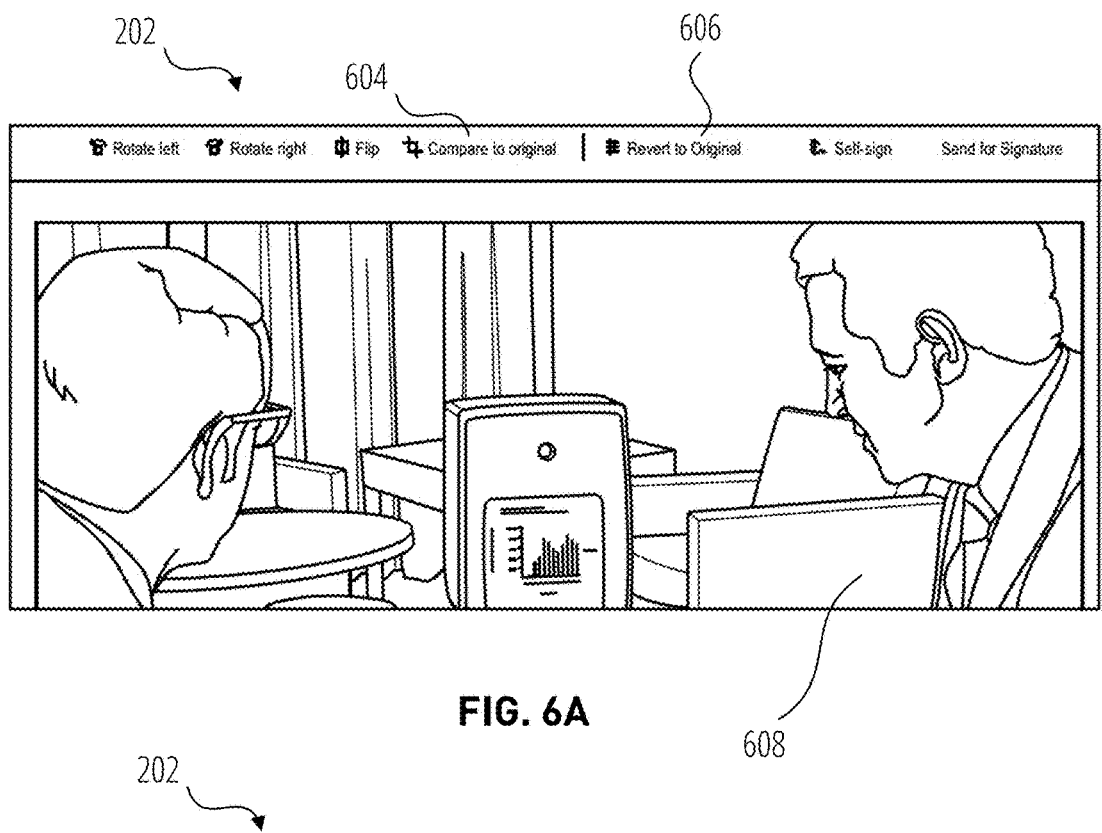
FIG. 6A illustrates user interface 202 presenting the obfuscated content for review in accordance with some embodiments of the present technology.
Figure 6B:
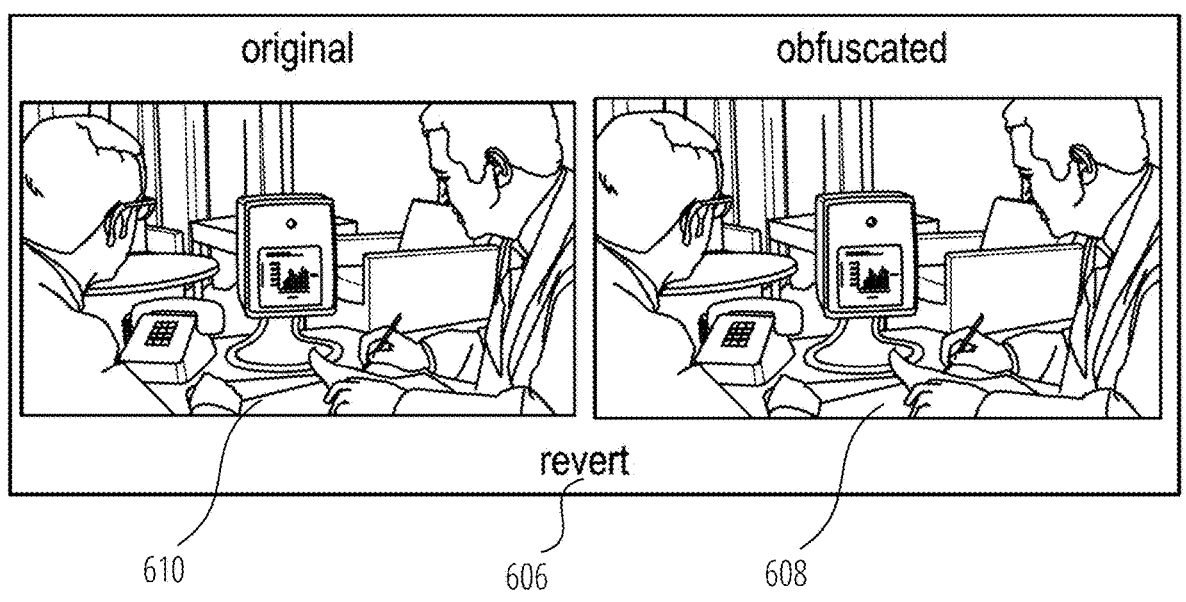
FIG. 6B illustrates user interface 202, presenting the obfuscated content adjacent to the original content in accordance with some embodiments of the present technology.

Given that the obfuscation service 206 can introduce artifacts into the obfuscated content, some users will desire to closely inspect the obfuscated content. FIG. 6A illustrates user interface 202 presenting the obfuscated content for review, and FIG. 6B illustrates user interface 202, presenting the obfuscated content adjacent to the original content. These screens of user interface 202 can facilitate a comparison of the original version of the content item with new version of the content item to determine if the new version of the content item is of acceptable quality (e.g., any visual artifacts of the obfuscation are few enough and/or minor enough to be acceptable to the user). While FIG. 6A and FIG. 6B illustrates a particular user interface, the present technology should not be considered limited to use with such an interface. Rather the user interfaces illustrated in FIG. 6A and FIG. 6B are provided to illustrate example options and example functionality provided by the present technology.

As illustrated in FIG. 6A user interface 202 can present the obfuscated content for review by a user. In addition to some basic image manipulation options, user interface 202 can present an option, compare to original content 604, to compare the the obfuscated content adjacent to the original content, and an option, revert to original version of the content item 606, to revert to the original content.

According to some examples, the method includes displaying the obfuscated content adjacent to the original content at block 502. For example, the user interface 202 illustrated in FIG. 2 may display the obfuscated content adjacent to the original content. For example, FIG. 6B illustrates user interface 202, presenting the obfuscated content 608 adjacent to the original content 610. The screen of user interface 202 illustrated in FIG. 6B can be the result of a selection of the option, compare to original content 604, presented in FIG. 6A or in other screens of user interface 202.

This screen of user interface 202 can facilitate a comparison of the original version of the content item with the new version of the content item to determine if the obfuscated content 608 is of acceptable quality (e.g., any visual artifacts of the obfuscation are few enough and/or minor enough to be acceptable to the user).

According to some examples, the method includes presenting an option to revert from the obfuscated content 608 to the original content 610 at block 504. For example, the user interface 202 illustrated in FIG. 2 may present an option, revert to original version of the content item 606, to revert from the obfuscated content 608 to the original content 610. When selected the option to revert causes content management system 102 to revert from the new version of the content item containing the obfuscated content to an original version of the content item containing the original content.

In some embodiments, reverting to the original version of the content item can make use of a versioning system of the content management system 102. For example, content management system 102 can maintain blocks making up the original version of the content item and any changed blocks making up new version of the content item in content item database 132. In some embodiments, content management system 102 might only display a single version of the content item in user interfaces, content management system 102 can revert to the original version of the content item or selectively access the original version of the content item or the new version of the content item as needed.

The versioning system of content management system 102 is designed to track and store different versions of files as they are updated. This feature allows users to recover previous versions of content items or view the history of changes made over time, providing a safeguard against accidental deletion or unwanted modifications. The versioning system works automatically. When a user modifies and saves a file stored in content management system 102, the service doesn't overwrite the old file. Instead, it saves the new version while retaining the old version(s) as well. Users can access these older versions through the website or app of the content management system 102.

In some embodiments, the user might determine that the obfuscated content contains too many artifacts, but might not want to revert to the original content. Alternatively, the obfuscated content might not contain any noticeable artifacts, and the user might be emboldened to try a greater level of obfuscation. In such examples, the user might desire to change one or more obfuscation parameters. According to some examples, the method includes presenting an option to adjust an obfuscation parameter used to create the obfuscated content at block 506. For example, the user interface 202 illustrated in FIG. 2 may present an option to adjust an obfuscation parameter used to create the obfuscated content. Wherein an increase in the obfuscation parameter would result in greater protection for the original content but may increase visible artifacts in the obfuscated content, and a decrease in the obfuscation parameter would result in less protection for the original content but may come with less visible artifacts in the obfuscated content. In some embodiments, the obfuscation parameter can be presented with a warning informing the user of the trade-off between greater protections and visible artifacts.

While FIG. 6A and FIG. 6B illustrate images as the content, the present technology works with video just as well—although greater processing is required. Additionally, other types of content can also be obfuscated, such as written documents obfuscated with homoglyphs or hidden text.

Figure 7:
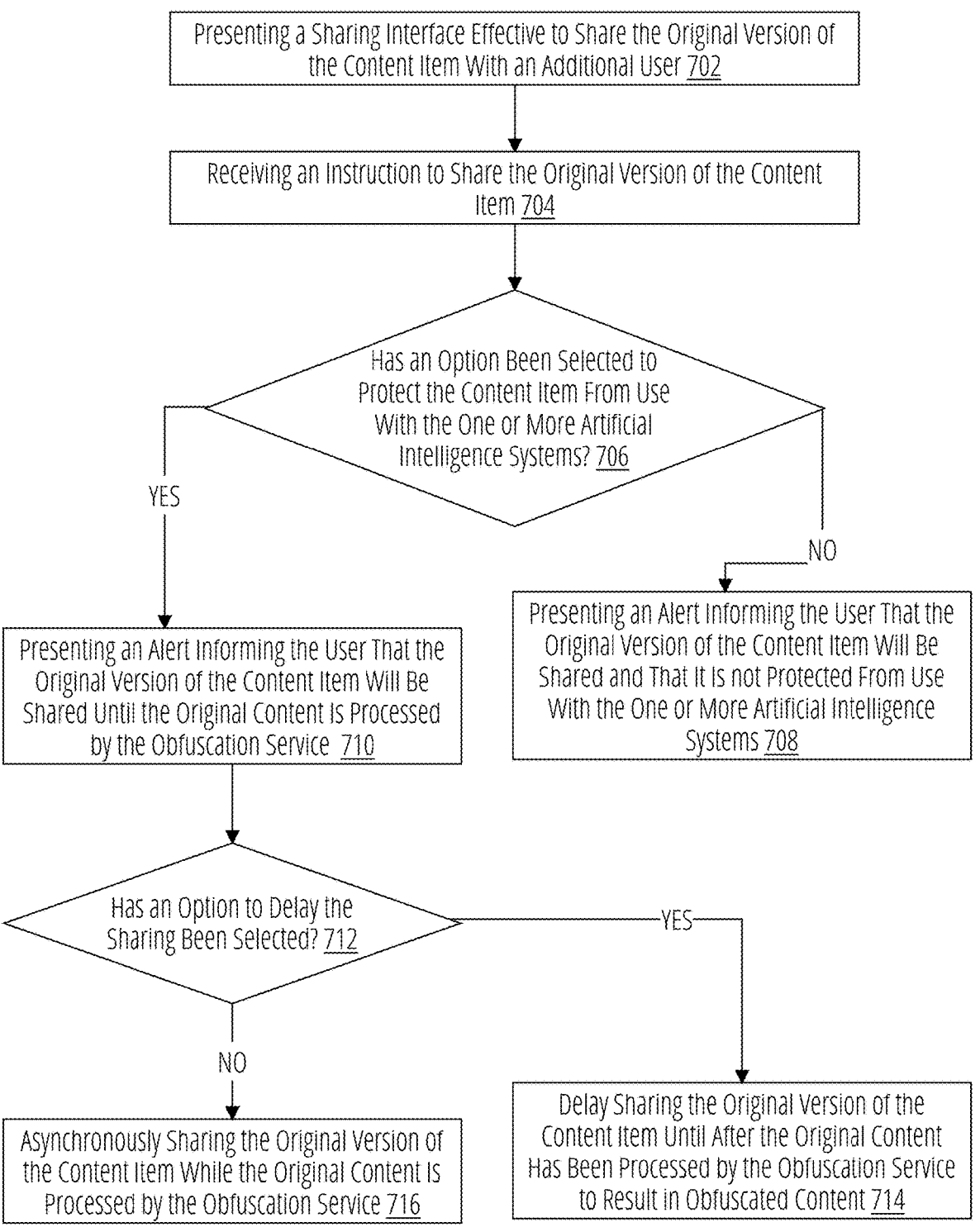
FIG. 7 illustrates an example method for protecting a content item from use by one or more artificial intelligence systems in a sharing interface in accordance with some embodiments of the present technology.

FIG. 7 illustrates an example method for protecting a content item from use by one or more artificial intelligence systems in a sharing interface in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

The present technology has particular relevance to content items that are accessible by entities other than the copyright holder, the author, and/or a license of the content item. After all, content items that are not accessible by a link are unlikely to be included in a training dataset for an artificial intelligence system. Similarly, a use of the content item in a prompt given to an artificial intelligence system is unlikely to be problematic when the prompt originates from a rights holder. Thus, most problematic uses of the content item by artificial intelligence systems occur when the content item is shared outside a group of rights holders.

According to some examples, the method includes presenting a sharing interface effective for sharing the original version of the content item with an additional user at block 702. For example, the user interface 202 illustrated in FIG.

2 may present a sharing interface effective for sharing the original version of the content item with an additional user.

According to some examples, the method includes receiving an instruction to share the original version of the content item at block 704. For example, the user interface 202 illustrated in FIG. 2 may receive an instruction to share the original version of the content item. In response to the user interface 202 receiving an indication that a content item should be shared, user interface 202 can present a sharing modal or other screen effective to configure options. An example of such a sharing user interface 202 is illustrated in FIG. 8.

According to some examples, the method includes determining whether an option has been selected to protect the content item from use with the one or more artificial intelligence systems at decision block 706. For example, the content management system 102 illustrated in FIG. 1 may determine, prior to sharing the original version of the content item, whether an option has been selected to protect the content item from use with the one or more artificial intelligence systems.

According to some examples, the method includes presenting an alert informing the user that the original version of the content item will be shared and that it is not protected from use with the one or more artificial intelligence systems at block 708. For example, the user interface 202 illustrated in FIG. 2 may present an alert informing the user that the original version of the content item will be shared and that it is not protected from use with one or more artificial intelligence systems.

Even when an option has been selected to protect the content item from use with one or more artificial intelligence systems, the user may still receive a warning that original content might be shared for a period while the original content is being processed into the obfuscated content at block 710. For example, the user interface 202 illustrated in FIG. 2 may present an alert informing the user that the original version of the content item will be shared for a period until the original content is processed by the obfuscation service. In some embodiments, the alert might identify the expected duration of the period. Generally, the period to process a content item into obfuscated content is expected to take a few minutes, assuming sufficient cloud resources are available at that time, but for context, such processing can take over 30 minutes on a laptop.

According to some examples, the method includes an option to delay the sharing been selected at decision block 712. For example, the content management system 102 illustrated in FIG. 1 determines whether an option to delay the sharing has been selected.

If the option to delay the sharing has been selected, the method includes delaying sharing the original version of the content item until after the original content has been processed by the obfuscation service to result in obfuscated content at block 714. For example, the content management system 102 illustrated in FIG. 1 may delay sharing the original version of the content item until after the original content has been processed by the obfuscation service to result in obfuscated content. In some embodiments, content management system 102 can create a workflow wherein the original content can be processed into the obfuscated content prior to creating a link. Thereby, once the link is created, it points to the obfuscated content. Alternatively, the link can be created, but access to the content item can be restricted until a new version of the content item including the obfuscated content is ready.

Still yet another option is to permit a link to be created that can share a visibility-distorted version of the original content until the original content is processed by the obfuscation service. Prior to the saving of the new version of the content item, including the obfuscated content, the visibility-distorted version is accessible to the recipient of the sharing, wherein the visibly distorted version is quick to process, but the content is visibly distorted.

If the option to delay the sharing has not been selected, the method includes asynchronously sharing the original version of the content item while the original content is processed by the obfuscation service at block 716. For example, the content management system 102 illustrated in FIG. 1 may asynchronously share the original version of the content item while the original content is processed by the obfuscation service. The original version of the content item is replaced by the new version of the content item once the new version of the content item is saved. A recipient of the sharing can access the original version of the content item until the new version is saved. In other words, the scenario for which the alert was provided at block 710 occurs in the asynchronous sharing embodiment.

In the embodiments addressed above, wherein a sharing link is created that first provides access to an original version of the content item or a stopgap, visibility-distorted version, and later the link provides access to the new version of the content item, including the obfuscated content, the versioning system of content management system 102 makes this possible. The sharing link will point to the most recent version of the content item such that if the original is replaced by a new version of the content item, the new version of the content item is the version that is accessible.

FIG. 8 illustrates an example sharing modal within the user interface, providing an option to obfuscate content that is to be shared in accordance with some embodiments of the present technology. For example, FIG. 8 illustrates user interface 202 presenting a sharing modal. In FIG. 8 a content item, an image, has been selected to be shared, and the user has configured advanced settings 804 specify that the users are receiving the sharing link have rights to view the content item. Additionally the user has configured advanced settings 804 to protect the content item from use by one or more artificial intelligence systems as addressed above.

While FIG. 8 illustrates a particular user interface, the present technology should not be considered limited to use with such an interface. Rather the user interfaces illustrated in FIG. 8 is provided to illustrate example options and example functionality provided by the present technology.

FIG. 9 illustrates an example method for rolling back a new version of the content item to an original version of the content item after the content item has been shared in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

It may happen that after a new version of the content item having the obfuscated content has been shared, the user might desire to have access to the original version of the content item again.

According to some examples, the method includes receiving a selection of an option to roll back the new version of the content item that has been shared to an original version of the content item containing the original content at block 902. For example, the user interface 202 illustrated in FIG. 2 may receive a selection of an option to roll back the new version of the content item that has been shared to an original version of the content item containing the original content. Such a selection of the option to roll back the new version of the content item to the original version of the content item could be received in a versioning interface.

According to some examples, the method includes presenting an alert informing the user that rolling back the new version of the content item to the original version of the content item will cause the original content that is not protected from use with one or more artificial intelligence systems to be accessible to the recipient of the sharing at block 904. For example, the user interface 202 illustrated in FIG. 2 may present an alert informing the user that rolling back the new version of the content item to the original version of the content item will cause the original content that is not protected from use with the one or more artificial intelligence systems to be accessible to the recipient of the sharing.

According to some examples, the method includes presenting an option to save the original version of the content item as a copy rather than rolling back the new version of the content item to the original version of the content item at block 906. For example, the user interface 202 illustrated in FIG. 2 may present an option to save the original version of the content item as a copy rather than rolling back the new version of the content item to the original version of the content item. As long as the new version of the content item is not reverted to an older version, the sharing of the new versions of the content item will not be affected. Accordingly, the user can select the option to create a copy of the content item containing the original content where the copy is not shared.

FIG. 10 illustrates an example method for updating an obfuscation method used to protect the original content in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As artificial intelligence systems improve, it is likely that older obfuscation methods will become less effective. Over time, it is probable that some artificial intelligence systems will be able to classify objects in images or otherwise analyze obfuscated content properly, and new obfuscation methods will become available that confound even the improved artificial intelligence systems. Accordingly, FIG. 10 addresses how to handle situations where an outdated obfuscation service was used to protect original content.

According to some examples, the method includes determining that a newer version of the obfuscation service used to protect the new version of the content item exists at block 1002. For example, the content management system 102 illustrated in FIG. 1 may determine that a newer version of the obfuscation service used to protect the new version of the content item exists. The older version of the obfuscation services might no longer be effective to confound the one or more artificial intelligence systems.

According to some examples, the method includes presenting a warning informing the user account that the new version of the content item is no longer protected from use with one or more artificial intelligence systems at block 1004. For example, the user interface 202 illustrated in FIG. 2 may present a warning informing the user account that the new version of the content item is no longer protected from use with one or more artificial intelligence systems.

According to some examples, the method suggests an alternative version of the obfuscation service instead of the obfuscation service used to create the new version of the content item at block 1006. For example, the content management system 102 illustrated in FIG. 1 may suggest an alternative version of the obfuscation service to provide updated obfuscation.

As used herein, the term obfuscation service refers to a service employing a particular obfuscation technology or version. Accordingly, when the present description refers to an alternative version of the obfuscation service, it can refer to a different entity, a different obfuscation technology, or a different version of an obfuscation technology.

According to some examples, the method includes receiving a selection of an option to automatically process the new version of the content item with the newer version of the obfuscation service to result in a second obfuscated version that can again protect the original content at block 1008. For example, the user interface 202 illustrated in FIG. 2 may receive a selection of an option to automatically process the new version of the content item with the newer version of the obfuscation service to result in a second obfuscated version that can again protect the original content. In some embodiments, rather than processing the new version, the versioning system of the content management system can be used to obtain the original content and process that using the newer version of the obfuscation service to result in a second obfuscated version.

In some embodiments, the user account can configure an automatic content protection rule that configures shared content items to be protected by obfuscation service using a sufficiently effective obfuscation technique, such that when an updated obfuscation service is available, content management system 102 can schedule the shared content items to have their obfuscation updated automatically. This can be handled by a queuing system whereby the most often accessed content items are updated before the less frequently accessed content items.

Figure 11:
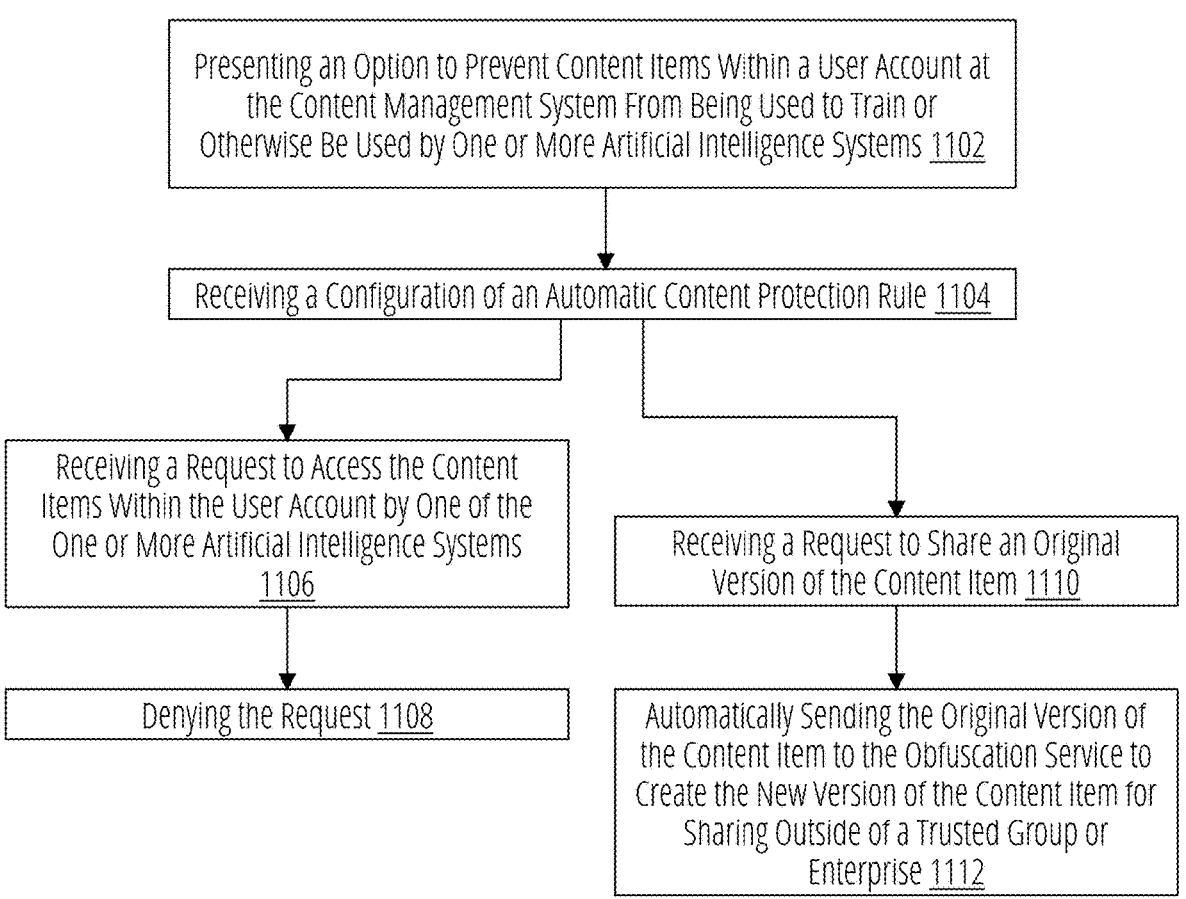
FIG. 11 illustrates an example method for utilizing an automatic content protection rule in accordance with some embodiments of the present technology.

FIG. 11 illustrates an example method for utilizing an automatic content protection rule in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

In some embodiments, a user might utilize an automatic content protection rule to avoid manually choosing to protect their content items.

According to some examples, the method includes presenting an option to prevent content items within a user account at the content management system from being used to train or otherwise be used by one or more artificial intelligence systems at block 1102. For example, the user interface 202 illustrated in FIG. 2 may present an option to prevent content items within a user account in the content management system from being used to train or otherwise be used by one or more artificial intelligence systems.

According to some examples, the method includes receiving a configuration of an automatic content protection rule at block 1104. For example, the content management system 102 illustrated in FIG. 1 may receive a configuration of an automatic content protection rule. The automatic content protection rule can be configured such that any content item to be shared should be protected by the obfuscation service. The automatic content protection rule can also attempt to block access to content items when it is suspected that the access is requested by an artificial intelligence system or a training service of an artificial intelligence system. The automatic content protection rule can configure shared content items to be protected by obfuscation service using a sufficiently effective obfuscation technique, such that when an updated obfuscation service is available, content management system 102 can schedule the shared content items to have their obfuscation updated automatically. The automatic content protection rule can also indicate that content items should not be used to train artificial intelligence systems of the content management system 102, which always has access to the content items.

According to some examples, the method includes receiving a request to access the content items within the user account by one of one or more artificial intelligence systems at block 1106. For example, the content management system 102 illustrated in FIG. 1 may receive a request to access the content items within the user account by one of one or more artificial intelligence systems.

According to some examples, the method includes denying the request at block 1108. For example, the content management system 102 illustrated in FIG. 1 may deny the request. The request might come from an IP address known to be associated with an artificial intelligence system or from a service used to train an artificial intelligence system. The request might come from an IP address that is attempting to access an unusual number of content items. Content management system 102 can employ any other method to block access to content items when it is suspected that the access is requested by an artificial intelligence system or a training service of an artificial intelligence system.

As noted above, this technique can also be extended to prevent content management system 102 from training its own artificial intelligence systems using the content item. In some embodiments, content management system 102 can utilize a third-party service to prevent or enforce the desire of a content owner to prevent content management system 102 from training its own artificial intelligence systems using the content item.

According to some examples, the method includes receiving a request to share an original version of the content item at block 1110. For example, the content management system 102 illustrated in FIG. 1 may receive a request to share an original version of the content item.

According to some examples, the method includes automatically sending the original version of the content item to the obfuscation service to create the new version of the content item for sharing outside of a trusted group or enterprise at block 1112. For example, the content management system 102 illustrated in FIG. 1 may automatically send the original version of the content item to the obfuscation service to create a new version of the content item for sharing outside of a trusted group or enterprise.

Figure 12:
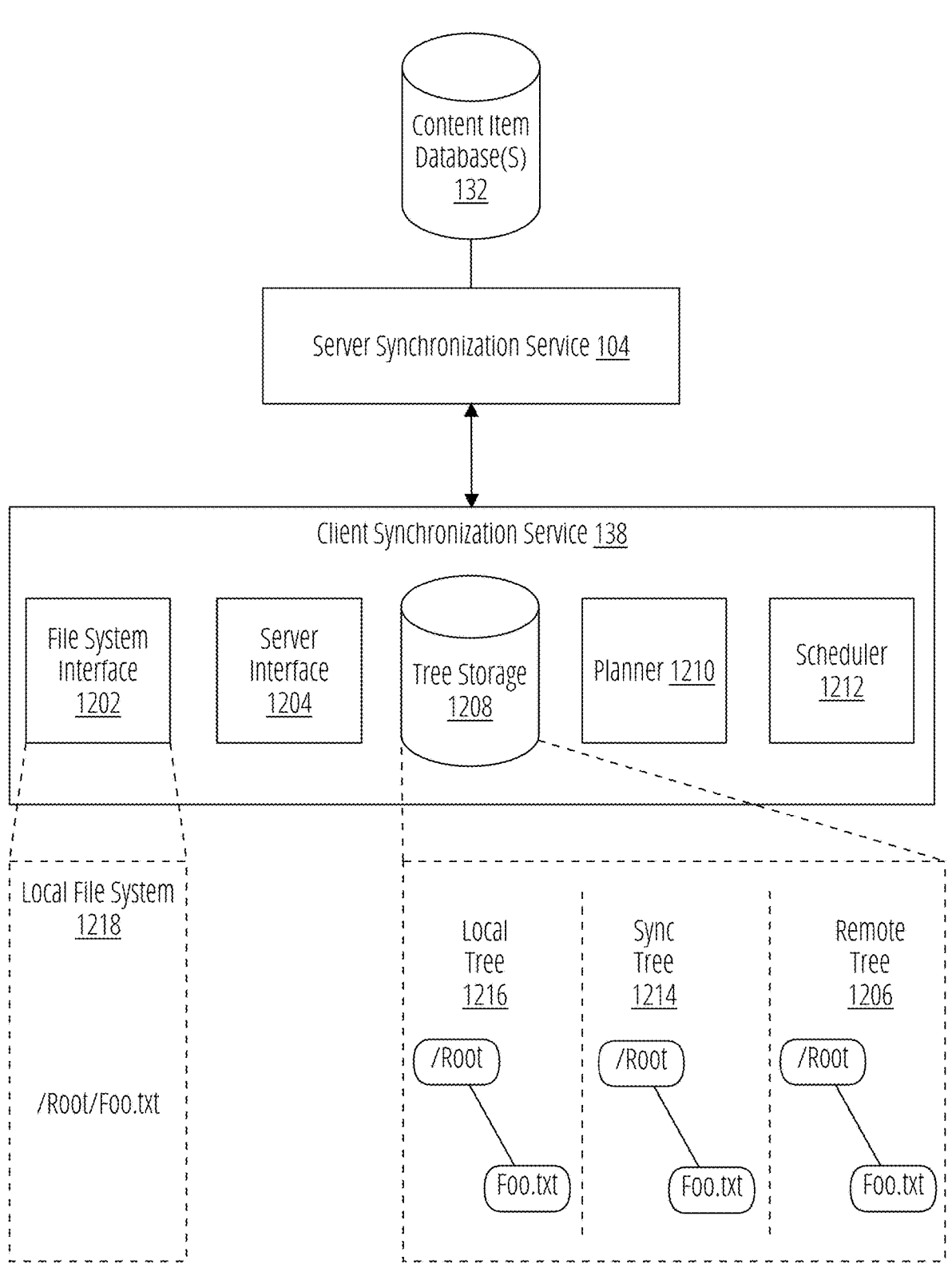
FIG. 12 shows an example of a client synchronization service in accordance with some embodiments of the present technology.

FIG. 12 shows an example of a client synchronization service 138, in accordance with some embodiments. Client synchronization service 138 may be implemented in the client device 134 of FIG. 1. However, in some embodiments, client synchronization service 138 may be implemented on another computing device. Client synchronization service 138 is configured to synchronize changes to content items between content management system 102 and the client device 134 on which client synchronization service 138 runs.

Client synchronization service 138 may include file system interface 1202, server interface 1204, tree storage 1208, planner 1210, and scheduler 1212. Additional or alternative components may also be included.

File system interface 1202 is configured to process changes to content items on local file system 1218 of client device 134 and update local tree 1216 or to make changes to local file system 1218. For example, file system interface 1202 can detect changes to content items on local file system 1218 of client device 134. Changes may also be made and detected via client application 136 of FIG. 1. File system interface 1202 may make updates to local tree 1216. The updates to local tree 1216 may be made based on the changes (new, deleted, modified, copied, renamed, or moved content items) to content items on the client device.

Server interface 1204 is configured to aid in the processing of remote changes to content items at content management system 102 and updating of remote tree 1206. For example, server interface 1204 can be in communication with server synchronization service 104 to synchronize changes to content items between client device 134 and content management system 102. Changes (new, deleted, modified, copied, renamed, or moved content items) to content items at content management system 102 may be detected and updates may be made to remote tree 1206 to reflect the changes at content management system 102. Server interface 1204 is also configured to aid in the communicating of local changes to content items at local file system 1218 to server synchronization service 104 to update content item database 132.

Tree storage 1208 is configured to store and maintain the tree data structures used by client synchronization service 138. For example, tree storage 1208 may store local tree 1216, sync tree 1214, and remote tree 1206. In some embodiments, tree storage 1208 may store the tree data structures in persistent memory (e.g., a hard disk or other secondary storage device) as well as in main memory (e.g., RAM or other primary storage device) in order to reduce latency and response time. For example, on start-up of the client device or client synchronization service 138, the tree data structures may be retrieved from persistent memory and loaded into main memory. Tree storage 1208 may access and update the tree data structures on main memory and, before the client device 134 or client synchronization service 138 is shut down, tree storage 1208 may store the updated tree data structures in persistent memory.

Remote tree 1206 represents a server state or the state of content items stored remotely from the client device (e.g., on a server of the content management system 102). Local tree 1216 represents a file system state or the state of the corresponding content items stored locally on the client device. Sync tree 1214 represents a merge base for the local tree and the remote tree. The merge base may be thought of as a common ancestor of the local tree and the remote tree or a last known synced state between the local tree and the remote tree.

Each tree data structure (e.g., remote tree 1206, sync tree 1214, or local tree 1216) may include one or more nodes. Each node in a tree data structure may represent a content item (e.g., a file, document, collection of content items, etc.). Each node in a tree data structure may contain data such as, for example, a directory content item identifier specifying the content item identifier of a parent node of the content item, a content item name for the content item, a content item identifier for the content item, and metadata for the content item.

Planner 1210 is configured to detect differences between the server state associated with content management system 102 and the file system state associated with the client device 134 based on the state of the tree data structures. For example, planner 1210 may determine if there is a difference between remote tree 1206 and sync tree 1214. A difference between remote tree 1206 and sync tree 1214 indicates that an action performed remotely on one or more content items stored at content management system 102 has caused the server state and the file system state to become out of sync. Similarly, planner 1210 may also determine if there is a difference between local tree 1216 and the sync tree 1214. A difference between local tree 1216 and sync tree 1214 indicates that an action performed locally on one or more content items stored in local file system 1218 on client device 134 has caused the server state and the file system state to become out of sync. If a difference is detected, planner 1210 generates a set of operations that synchronize the tree data structures.

In some scenarios, a set of operations generated based on a difference between the remote tree and the sync tree and a set of operations generated based on a difference between the local tree and the sync tree may conflict. Planner 1210 may also be configured to merge the two sets of operations into a single merged plan of operations.

Scheduler 1212 is configured to take the generated plan of operations and manage the execution of those operations. According to some embodiments, scheduler 1212 converts each operation in the plan of operations into a series of one or more tasks that need to be executed in order to perform the operation. In some scenarios, some tasks may become out dated or no longer relevant. Scheduler 1212 is configured to identify those tasks and cancel them.

When a difference exists between local tree 1216 and sync tree 1214, a change needs to be synchronized to content management system 102. To synchronize a change in local file system 1218 to content management system 102, client synchronization service can commit an intent to server synchronization service 104 pertaining to specific synchronization operations. To commit the intent, client synchronization service 138 on client device 134 records an intent to commit an operation at client device 134. Client synchronization service 138 can record the intent to commit the operation durably on disk or memory at client device 134 to track the pending commit. Client device 134 can store dirty commit records and track modifications until an event triggers removal of the pending commit(s), such as a failure or success. Client synchronization service 138 also commits the operation to server synchronization service 104 by sending a message to server synchronization service 104 requesting to commit the operation.

Server synchronization service 104 can send a return message indicating whether the commit to content management system 102 succeeded or indicating an error. Only once client synchronization service 138 learns that the commit succeeded will client synchronization service 138 update remote tree 1206 and sync tree 1214 to include the synchronized operation and clear the intent to commit the operation from client device 134.

Client application 136 can learn of a change existing at a server by requesting information regarding events occurring on content items recorded in content item database 132 since a last synchronization time known to the client device 134. In some embodiments, client synchronization service 138 makes a request for updated information periodically, or in response to receiving notifications about possible changes. When a change has occurred in the account at the content management system, server synchronization service 104 can send information about the operation that was performed to client synchronization service 138 which can update remote tree 1206. Thereafter, client synchronization service 138 can detect a difference between remote tree 1206 and sync tree 1214 indicating that local file system 1218 needs to be updated. Planner 1210 can identify operations needed to update local file system 1218, and server interface 1204 can request any data, such as blocks making up content items, etc. from content management system 102.

Client synchronization service 138 can update local file system 1218, local tree 1216, and sync tree 1214 to bring the system into a synchronized state. Additionally, client synchronization service 138 can store information identifying the synchronization time pertaining to the information received from content item database 132 to indicate that client application is up to date to at least the last synchronization time. In some embodiments, the last synchronization time pertains to a row in content item database 132, and can be stored as part of a cryptographically signed cursor that is received from content management system 102. The next time client synchronization service requests updated information, it will supply the cursor to identify a point in content item database 132 from which to begin reading.

Figure 13:
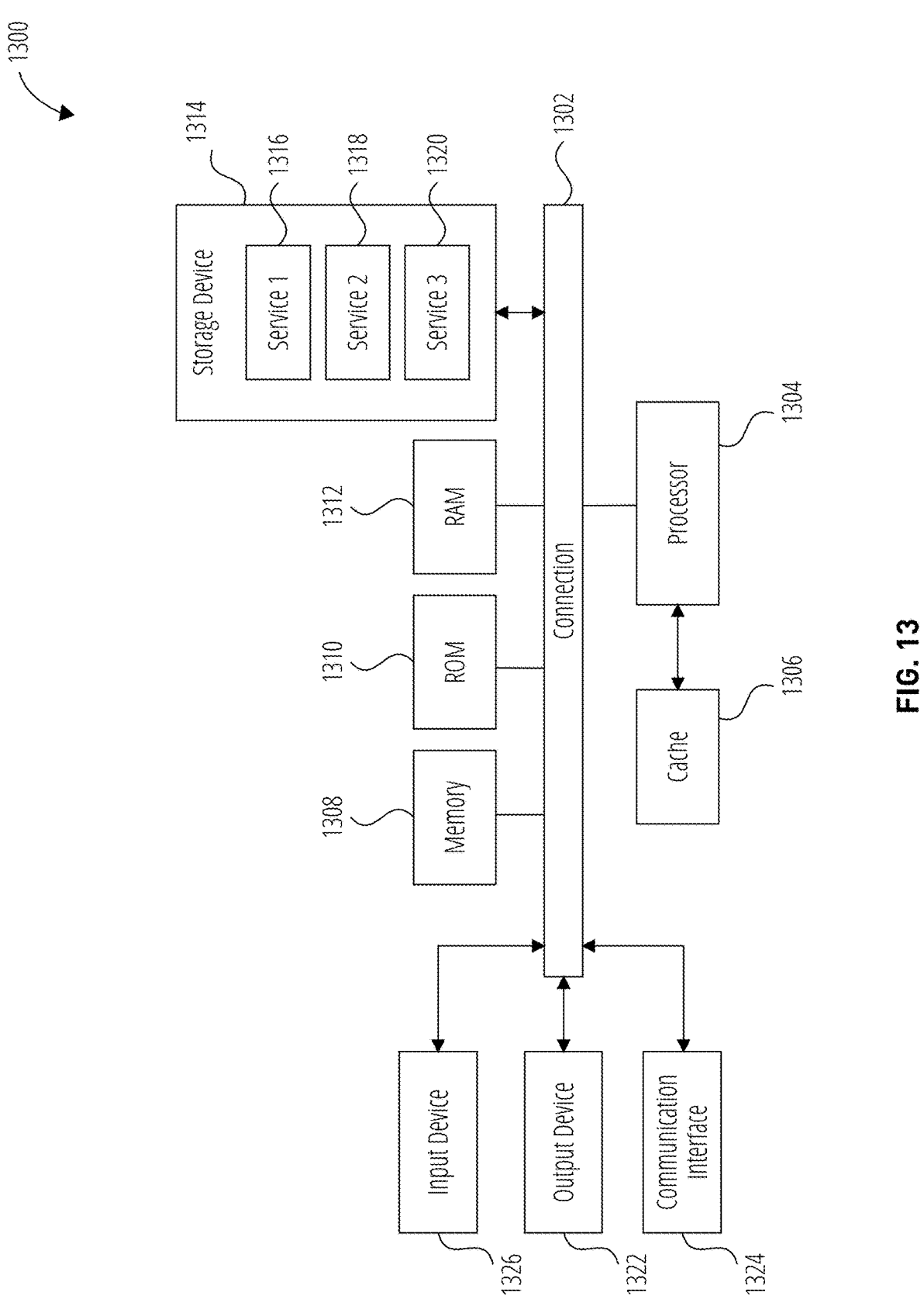
FIG. 13 shows an example of a system for implementing certain aspects of the present technology.

FIG. 13 shows an example of computing system 1300, which can be for example any computing device making up content management system 102, client device 134, or obfuscation service 206, or any component thereof in which the components of the system are in communication with each other using connection 1302. Connection 1302 can be a physical connection via a bus, or a direct connection into processor 1304, such as in a chipset architecture. Connection 1302 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1300 includes at least one processing unit (CPU or processor) 1304 and connection 1302 that couples various system components including system memory 1308, such as read-only memory (ROM) 1310 and random access memory (RAM) 1312 to processor 1304. Computing system 1300 can include a cache of high-speed memory 1306 connected directly with, in close proximity to, or integrated as part of processor 1304.

Processor 1304 can include any general purpose processor and a hardware service or software service, such as services 1316, 1318, and 1320 stored in storage device 1314, configured to control processor 1304 as well as a special-purpose processor where software instructions are incorporated into the actual processor design. Processor 1304 may essentially be a completely self-contained computing system, containing multiple cores or processors, a bus, memory controller, cache, etc. A multi-core processor may be symmetric or asymmetric.

To enable user interaction, computing system 1300 includes an input device 1326, which can represent any number of input mechanisms, such as a microphone for speech, a touch-sensitive screen for gesture or graphical input, keyboard, mouse, motion input, speech, etc. Computing system 1300 can also include output device 1322, which can be one or more of a number of output mechanisms known to those of skill in the art. In some instances, multimodal systems can enable a user to provide multiple types of input/output to communicate with computing system 1300. Computing system 1300 can include communication interface 1324, which can generally govern and manage the user input and system output. There is no restriction on operating on any particular hardware arrangement, and therefore the basic features here may easily be substituted for improved hardware or firmware arrangements as they are developed.

Storage device 1314 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1314 can include software services, servers, services, etc., that when the code that defines such software is executed by the processor 1304, it causes the system to perform a function. In some embodiments, a hardware service that performs a particular function can include the software component stored in a computer-readable medium in connection with the necessary hardware components, such as processor 1304, connection 1302, output device 1322, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects

The present technology includes computer-readable storage mediums for storing instructions, and systems for executing any one of the methods embodied in the instructions addressed in the aspects of the present technology presented below:

Aspect 1. A method for presenting a user interface to cause original contents within a content management system to be protected from use with an artificial intelligence system, the method comprising: receiving, by a user interface, a selection of an option to protect original content in a content item from use with an artificial intelligence system, the user interface displaying contents of a content management system including the original content; causing the content item containing the original content to be processed by an obfuscation service to result in obfuscated content, whereby the obfuscated content is configured to confound one or more artificial intelligence systems but is still visible to a human viewer; and storing the obfuscated content in the content management system as a new version of the content item.

Aspect 2. The method of Aspect 1, wherein the selection of the option to protect the original content is a selection of a collection of content items with an option to protect the content items within the collection of content items.

Aspect 3. The method of any one of Aspects 1-2, further comprising: displaying the obfuscated content adjacent to the original content; presenting an option to revert from the obfuscated content to the original content, whereby, when selected the option to revert causes a file system to revert from the new version of the content item containing the obfuscated content to an original version of the content item containing the original content.

Aspect 4. The method of any one of Aspects 1-3, further comprising: displaying the obfuscated content adjacent to the original content; presenting an option to adjust an obfuscation parameter used to create the obfuscated content, wherein an increase in the obfuscation parameter would result in greater protection for the original content but may increase visible artifacts in the obfuscated content, and a decrease in the obfuscation parameter would result in less protection for the original content but may come with less visible artifacts in the obfuscated content, wherein the obfuscation parameter is presented with a warning informing the user of the trade-off between greater protections and visible artifacts.

Aspect 5. The method of any one of Aspects 1-4, further comprising: presenting an option to select a particular obfuscation service; and presenting an option to adjust an obfuscation parameter used to create the obfuscated content, wherein an increase in the obfuscation parameter would result in greater protection for the original content but may increase visible artifacts in the obfuscated content, and a decrease in the obfuscation parameter would result in less protection for the original content but may come with less visible artifacts in the obfuscated content Aspect 6. The method of any one of Aspects 1-5, wherein the user interface is a sharing interface effective to share the original version of the content item with an additional user.

Aspect 7. The method of any one of Aspects 1-6, further comprising: receiving a selection of a sharing option in the sharing interface that is configured to cause the original version of the content item to be shared with the additional user prior to the selection of the option to protect the original content from use with the one or more artificial intelligence systems; asynchronously sharing the original version of the content item while the original content is processed by the obfuscation service, whereby the original version of the content item is replaced by the new version of the content item once the new version is saved, whereby a recipient of the sharing can access the original version of the content item until the new version is saved.

Aspect 8. The method of any one of Aspects 1-7, further comprising: receiving a selection of a sharing option in the sharing interface that is configured to cause the original version of the content item to be shared with the additional user prior to the selection of the option to protect the original content from use with the one or more artificial intelligence systems; after the receiving the selection of the sharing option, presenting an alert informing the user that the original version of the content item will be shared and that it is not protected from use with the one or more artificial intelligence systems; presenting an alert informing the user that the original version of the content item will be shared until the original content is processed by the obfuscation service after the receiving the selection of the option to protect the original content in the original version of the content item from use with the one or more artificial intelligence systems; and receiving a selection of an option to delay sharing the original version of the content item until after the original content has been processed by the obfuscation service to result in obfuscated content, whereby a new version of the content item with the obfuscated content is accessible to the recipient user.

Aspect 9. The method of any one of Aspects 1-8, further comprising: presenting an alert informing the user that the original version of the content item will be shared until the original content is processed by the obfuscation service after the receiving the selection of the option to protect the original content in the original version of the content item from use with the one or more artificial intelligence systems; presenting a further option to share a visibility-distorted version of the original content until the original content is processed by the obfuscation service, whereby, prior to the saving of the new version, the visibility-distorted version is accessible to the recipient of the sharing, wherein the visibly distorted version is quick to process but the content is visibly distorted.

Aspect 10. The method of any one of Aspects 1-9, further comprising: receiving a selection of an option to roll back the new version of the content item to an original version of the content item containing the original content; presenting an alert informing the user that the rolling back the new version of the content item to the original version of the content item will cause the original content that is not protected from use with the one or more artificial intelligence systems to be accessible to the recipient of the sharing.

Aspect 11. The method of any one of Aspects 1-10, further comprising: presenting an option to save the original version of the content item as a copy rather than rolling back the new version of the content item to the original version of the content item, whereby the sharing of the new versions of the content item will not be affected.

Aspect 12. The method of any one of Aspects 1-11, further comprising: displaying a notification to inform the user that they are attempting to share the original content that is not protected from use with the one or more artificial intelligence systems.

Aspect 13. The method of any one of Aspects 1-12, further comprising: receiving a selection of an option to roll back the new version of the content item to an original version of the content item containing the original content.

Aspect 14. The method of any one of Aspects 1-13, further comprising: presenting the new version of the content item in a second user interface of the content management system, wherein the new version of the content item is presented with an indicator to signal that the new version of the content item is protected from use with the one or more artificial intelligence systems.

Aspect 15. The method of any one of Aspects 1-14, further comprising: determining that a newer version of the obfuscation service used to protect new version of the content item exits, wherein the older version of the obfuscation services might no longer be effective to confound the one or more artificial intelligence systems; presenting a warning informing the user account that new version of the content item is no longer protected from use with the one or more artificial intelligence systems; receiving a selection of an option to automatically process the new version of the content item with the newer version of the obfuscation service to result in a second obfuscated version that can again protect the original content.

Aspect 16. The method of any one of Aspects 1-15, further comprising: suggesting an alternative version of the obfuscation service instead of the obfuscation service, wherein the alternative version of the obfuscation service is suggested because a previously used or selected obfuscation service may no longer be effective to confound the one or more artificial intelligence systems.

Aspect 17. The method of any one of Aspects 1-16, wherein the content item is an image, a video, or a document.

Aspect 18. The method of any one of Aspects 1-17, further comprising: presenting an option to prevent content items within a user account at the content management system from being used to train the one or more artificial intelligence systems; receiving a request to access the content items within the user account by on of the one or more artificial intelligence systems; and denying the request.

Aspect 19. The method of any one of Aspects 1-18, further comprising: receiving a configuration of an automatic content protection rule, wherein when the original version of the content item triggers the automatic content protection rule, the content item containing the original content is processed by the obfuscation service to result in the obfuscated content, wherein an example automatic content protection rule is to apply obfuscation when the original content is to be shared outside an enterprise.

What is claimed is:

1. A method comprising:

receiving, by a user interface, a selection of an option to protect original content in a content item from use with an artificial intelligence system, the user interface displaying the content item in a content management system including the original content;

causing the content item containing the original content to be processed by an obfuscation service to result in obfuscated content, whereby the obfuscated content is configured to confound one or more artificial intelligence systems but is still visible to a human viewer; and storing the obfuscated content in the content management system as a new version of the content item.

2. The method of claim 1, wherein the selection of the option to protect the original content is to select a collection of content items and to protect the content items within the collection of content items automatically.

3. The method of claim 1, further comprising:

displaying the obfuscated content adjacent to the original content; and presenting an option to revert from the obfuscated content to the original content, wherein, when selected, the option to revert causes a file system to revert from the new version of the content item containing the obfuscated content to an original version of the content item containing the original content.

4. The method of claim 1, wherein the user interface is a sharing interface effective to share the original version of the content item with an additional user, the method further comprising:

receiving a selection of a sharing option in the sharing interface that is configured to cause the original version of the content item to be shared with the additional user prior to the selection of the option to protect the original content from use with the one or more artificial intelligence systems.

5. The method of claim 1, wherein the user interface is a sharing interface effective to share the original version of the content item with an additional user, the method further comprising:

receiving a selection of an option to roll back the new version of the content item to an original version of the content item containing the original content;

presenting an alert informing the user that the rolling back the new version of the content item to the original version of the content item will cause the original content that is not protected from use with the one or more artificial intelligence systems to be accessible to a recipient of the sharing.

6. The method of claim 1, wherein the user interface is a sharing interface effective to share the original version of the content item with an additional user, the method further comprising:

displaying a notification to inform a user account that they are attempting to share the original content that is not protected from use with the one or more artificial intelligence systems.

7. The method of claim 1, further comprising:

determining that a newer version of the obfuscation service used to protect the new version of the content item exits;

presenting a warning informing a user account that the newer version of the obfuscation service is available;

receiving a selection of an option to automatically process the new version of the content item with the newer version of the obfuscation service to result in a second obfuscated version.

8. The method of claim 1, further comprising:

receiving a configuration of an automatic content protection rule, wherein when the original version of the content item triggers the automatic content protection rule, the content item containing the original content is processed by the obfuscation service to result in the obfuscated content, wherein an example automatic content protection rule is to apply obfuscation when the original content is to be shared outside an enterprise.

9. A computing system comprising:

at least one processor; and a memory storing instructions that, when executed by the at least one processor, cause the computing system to:

receive, by a user interface, a selection of an option to protect original content in a content item from use with an artificial intelligence system, the user interface displaying the content item in a content management system including the original content, wherein the user interface is a sharing interface effective to share an original version of the content item with an additional user;

cause the content item containing the original content to be processed by an obfuscation service to result in obfuscated content, whereby the obfuscated content is configured to confound one or more artificial intelligence systems but is still visually similar to the original content to a human viewer; and store the obfuscated content in the content management system as a new version of the content item.

10. The computing system of claim 9, wherein the selection of the option to protect the original content is to select a collection of content items and to protect the content items within the collection of content items automatically in a batch.

11. The computing system of claim 9, wherein the instructions further cause the computing system to:

display the obfuscated content adjacent to the original content; and present an option to revert from the obfuscated content to the original content, whereby, when selected the option to revert causes a file system to revert from the new version of the content item containing the obfuscated content to an original version of the content item containing the original content.

12. The computing system of claim 9, wherein the instructions further cause the computing system to:

receive a selection of a sharing option in the sharing interface that is configured to cause the original version of the content item to be shared with the additional user prior to the selection of the option to protect the original content from use with the one or more artificial intelligence systems.

13. The computing system of claim 9, wherein the instructions further cause the computing system to:

receive a selection of an option to roll back the new version of the content item to an original version of the content item containing the original content;

present an alert informing the user that the rolling back the new version of the content item to the original version of the content item will cause the original content that is not protected from use with the one or more artificial intelligence systems to be accessible to a recipient of the sharing.

14. The computing system of claim 9, wherein the content is a video or an image.

15. The computing system of claim 9, wherein the instructions further configure the at least one processor to:

determine that a newer version of the obfuscation service used to protect the new version of the content item exits;

automatically process the new version of the content item with the newer version of the obfuscation service to result in a second obfuscated version.

16. The computing system of claim 9, wherein the instructions further configure the at least one processor to:

receive a configuration of an automatic content protection rule, wherein when the original version of the content item triggers the automatic content protection rule, the content item containing the original content is processed by an obfuscation service to result in the obfuscated content, wherein an example automatic content protection rule is to apply obfuscation when the original content is to be shared outside an enterprise.

17. A non-transitory computer-readable storage medium, the computer-readable storage medium including instructions that when executed by at least one processor, cause the at least one processor to:

receive, by a user interface, a selection of an option to protect original content in a content item from use with an artificial intelligence system, the user interface displaying the content item in a content management system including the original content;

cause the content item containing the original content to be processed by an obfuscation service to result in obfuscated content, whereby the obfuscated content is configured to confound one or more artificial intelligence systems but is still visible to a human viewer; and store the obfuscated content in the content management system as a new version of the content item.

18. The computer-readable storage medium of claim 17, wherein the instructions further configure the at least one processor to:

display the obfuscated content adjacent to the original content;

present an option to revert from the obfuscated content to the original content, whereby, when selected the option to revert causes a file system to revert from the new version of the content item containing the obfuscated content to an original version of the content item containing the original content.

19. The computer-readable storage medium of claim 17, wherein the user interface is a sharing interface effective to share the original version of the content item with an additional user, wherein the instructions further configure the at least one processor to:

receive a selection of a sharing option in the sharing interface that is configured to cause the original version of the content item to be shared with the additional user prior to the selection of the option to protect the original content from use with the one or more artificial intelligence systems.

20. The computer-readable storage medium of claim 17, wherein the user interface is a sharing interface effective to share the original version of the content item with an additional user, wherein the instructions further configure the at least one processor to:

receive a selection of an option to roll back the new version of the content item to an original version of the content item containing the original content;

present an alert informing the user that the rolling back the new version of the content item to the original version of the content item will cause the original content that is not protected from use with the one or more artificial intelligence systems to be accessible to a recipient of the sharing.

* * * * *